(12) United States Patent
Nguyen et al.

(10) Patent No.: US 12,041,673 B2
(45) Date of Patent: Jul. 16, 2024

(54) FEEDBACK FOR SIDELINK TRANSMISSION

(71) Applicant: QUALCOMM Incorporated, San Diego, CA (US)

(72) Inventors: Tien Viet Nguyen, Bridgewater, NJ (US); Kapil Gulati, Montgomery, NJ (US); Hong Cheng, Basking Ridge, NJ (US); Junyi Li, Chester, NJ (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/036,983

(22) Filed: Sep. 29, 2020

(65) Prior Publication Data

US 2021/0100046 A1 Apr. 1, 2021

Related U.S. Application Data

(60) Provisional application No. 62/909,149, filed on Oct. 1, 2019.

(51) Int. Cl.
*H04W 76/14* (2018.01)
*H04B 7/06* (2006.01)
(Continued)

(52) U.S. Cl.
CPC .......... *H04W 76/14* (2018.02); *H04B 7/0632* (2013.01); *H04L 1/18* (2013.01); *H04L 47/30* (2013.01)

(58) Field of Classification Search
None
See application file for complete search history.

(56) References Cited

U.S. PATENT DOCUMENTS 10,157,539 B1 * 12/2018 Hoover .................. H04W 4/40
10,383,023 B1 * 8/2019 Hahn ................. H04W 36/0066
(Continued)

FOREIGN PATENT DOCUMENTS

| CN | 107040959 A | 8/2017 |
| CN | 107040972 A | 8/2017 |
| CN | 107925906 A | 4/2018 |

OTHER PUBLICATIONS

Fraunhofer HHI, et al., "Resource Allocation for Mode 2 NR V2X", 3GPP Draft, 3GPP TSG RAN WG1 #98, R1-1908679_Mode2RA, .3rd Generation Partnership Project (3GPP), Mobile Competence Centre, 650, Route Des Lucioles, F-06921 Sophia-Antipolis Cedex, France, vol. RAN WG1, No. Prague, CZ, Aug. 2019-Aug. 30, 2019, Aug. 16, 2019 (Aug. 16, 2019), XP051765287, 7 Pages, Retrieved from the Internet: URL:http://www.3gpp.org/ftp/tsg_ran/WG1_RL1/TSGR1_98/Docs/R1-1908679.zip [retrieved on Aug. 16, 2019] Sections 2 and 3.

(Continued)

*Primary Examiner* — Sithu Ko
(74) *Attorney, Agent, or Firm* — Holland & Hart LLP /Qualcomm Incorporated

(57) ABSTRACT

Methods, systems, and devices for wireless communications are described. A receiver user equipment (UE) may communicate with a transmitter UE in a sidelink channel to report a congestion index to the transmitter UE and/or additional transmitter UEs, where the transmitter UE(s) may then adjust one or more sidelink operation parameters based on the reported congestion index. In some cases, the transmitter UE may report the congestion index to an upper layer, to other transmitter UEs, to application layers, or a combination thereof. The transmitter UEs 115 and/or application layer may then adjust one or more sidelink transmission operation parameters based on the reported congestion index. For example, the transmitter UEs and/or application (Continued)

layer may adjust threshold values to lessen a number of retransmissions and lessen congestion.

30 Claims, 14 Drawing Sheets

(51) Int. Cl.
  *H04L 1/18* (2023.01)
  *H04L 47/30* (2022.01)
  *H04W 72/12* (2023.01)

(56) References Cited

U.S. PATENT DOCUMENTS

| | | | | |
|---|---|---|---|---|
| 11,089,625 B2* | 8/2021 | Sartori | | H04L 5/0051 |
| 11,115,890 B2* | 9/2021 | Lee | | H04W 4/40 |
| 2016/0128082 A1* | 5/2016 | Chen | | H04W 72/1221 370/329 |
| 2017/0118671 A1* | 4/2017 | Lee | | H04W 72/02 |
| 2017/0134287 A1* | 5/2017 | Shaw | | H04L 69/40 |
| 2018/0007723 A1* | 1/2018 | Lee | | H04W 4/46 |
| 2018/0035448 A1 | 2/2018 | Gupta et al. | | |
| 2018/0110085 A1* | 4/2018 | Tseng | | H04L 1/1812 |
| 2018/0242190 A1* | 8/2018 | Khoryaev | | H04W 28/0284 |
| 2018/0255532 A1* | 9/2018 | Li | | H04W 72/042 |
| 2018/0279325 A1* | 9/2018 | Huang | | H04W 24/08 |
| 2019/0007974 A1* | 1/2019 | Nguyen | | H04W 4/44 |
| 2019/0037635 A1* | 1/2019 | Guo | | H04W 76/19 |
| 2019/0141539 A1 | 5/2019 | Yerramalli et al. | | |
| 2019/0149365 A1* | 5/2019 | Chatterjee | | H04L 25/0226 370/329 |
| 2019/0150157 A1* | 5/2019 | Panteleev | | H04W 76/14 370/329 |
| 2019/0239039 A1* | 8/2019 | Hahn | | H04W 84/005 |
| 2019/0306911 A1* | 10/2019 | Hahn | | H04W 76/27 |
| 2019/0363843 A1* | 11/2019 | Gordaychik | | H04L 1/08 |
| 2019/0380132 A1* | 12/2019 | Hu | | H04W 80/12 |
| 2020/0022089 A1* | 1/2020 | Guo | | H04L 1/1812 |
| 2020/0029245 A1* | 1/2020 | Khoryaev | | H04B 17/318 |
| 2020/0045664 A1* | 2/2020 | Choi | | H04W 68/005 |
| 2020/0045674 A1* | 2/2020 | Tseng | | H04W 76/14 |
| 2020/0092685 A1* | 3/2020 | Fehrenbach | | H04W 84/047 |
| 2020/0106500 A1 | 4/2020 | Noh et al. | | |
| 2020/0106566 A1* | 4/2020 | Yeo | | H04W 28/04 |
| 2020/0112400 A1* | 4/2020 | Lee | | H04L 5/0055 |
| 2020/0112982 A1* | 4/2020 | Li | | H04W 76/14 |
| 2020/0154404 A1* | 5/2020 | Göktepe | | H04L 5/0053 |
| 2020/0163005 A1* | 5/2020 | Rao | | H04W 76/14 |
| 2020/0205166 A1* | 6/2020 | Huang | | H04W 76/27 |
| 2020/0266857 A1* | 8/2020 | Hwang | | H04L 1/1864 |
| 2020/0274649 A1* | 8/2020 | Lee | | H04W 72/20 |
| 2020/0288286 A1* | 9/2020 | Hwang | | H04L 27/2607 |
| 2020/0305176 A1* | 9/2020 | Hu | | H04B 7/0626 |
| 2020/0314939 A1* | 10/2020 | Park | | H04W 72/12 |
| 2020/0351855 A1* | 11/2020 | Kung | | H04W 56/0045 |
| 2020/0403731 A1* | 12/2020 | Zhang | | H04W 76/14 |
| 2020/0413348 A1* | 12/2020 | Ryu | | H04W 48/12 |
| 2021/0014831 A1* | 1/2021 | Ryu | | H04W 72/02 |
| 2021/0051505 A1* | 2/2021 | Xu | | H04W 72/0406 |
| 2021/0105055 A1* | 4/2021 | Chae | | H04B 7/088 |
| 2021/0105661 A1* | 4/2021 | Baghel | | H04W 28/0289 |
| 2021/0258743 A1* | 8/2021 | Boban | | H04W 4/40 |
| 2021/0306824 A1* | 9/2021 | Li | | H04W 4/40 |
| 2021/0400636 A1* | 12/2021 | Seo | | H04L 1/1861 |
| 2021/0410084 A1* | 12/2021 | Li | | H04W 52/265 |
| 2022/0123905 A1* | 4/2022 | Lu | | H04L 1/18 |

OTHER PUBLICATIONS

Intel Corporation: "On Combination of Sensing and Geo-Based Transmission Techniques for Sidelink V2V Communication", 3GPP Draft, 3GPP TSG RAN WG1 Meeting #84 bis, R1-162933, Intel—V2V Geosensing, 3rd Generation Partnership Project (3GPP), Mobile Competence Centre, 650, Route Des Lucioles, F-06921 Sophia-Antipolis Cedex, France, vol. RAN WG1, No. Busan, Korea, Apr. 11, 2016-Apr. 15, 2016, Apr. 2, 2016 (Apr. 2, 2016), XP051080417, pp. 1-5, Retrieved from the Internet: URL:http://www.3gpp.org/ftp/tsg_ran/WGI_RL1/TSGR1_84b/Docs/ [retrieved on Apr. 2, 2016] Section 4.

Intel Corporation: "Summary#4 for AI 7.2.4.2.2 Mode-2 Resource Allocation", 3GPP Draft, 3GPP TSG RAN WG1 Meeting #98, R1-1909892—Summary#4 of 5G V2X Mode 2 V1, 3rd Generation Partnership Project (3GPP), Mobile Competence Centre, 650, Route Des Lucioles, F-06921, Sophia-Antipolis Cedex, France, vol. RAN WG1, No. Prague, Czech Republic, Aug. 26, 2019-Aug. 30, 2019, Sep. 3, 2019 (Sep. 3, 2019), XP051766483, 34 pages, Retrieved from the Internet: URL: http://www.3gpp.org/ftp/tsg_ran/WG1_RL1/TSGR1_98/Docs/R1-1909892.zip [retrieved on Sep. 3, 2019] . paragraph [0002], p. 26, p. 29, Section 4.

International Search Report and Written Opinion—PCT/US2020/053624—ISA/EPO—Mar. 1, 2021.

Qualcomm Incorporated: Sidelink Resource Allocation Mechanism for NR V2X, 3GPP Draft, 3GPP Tsg Ran WG1 #98, R1-1909254_ Sidelink Resource Allocation Mechanism for NR V2X, 3rd Generation Partnership Project (3GPP), Mobile Competence Centre, 650, Route Des Lucioles, F-06921 Sophia-Antipolis Cedex, vol. RAN WG1, No. Prague, Czech Republic, Aug. 26, 2019-Aug. 30, 2019, Aug. 17, 2019 (Aug. 17, 2019), XP051765859, 17 Pages, Retrieved from the Internet: URL:http://www.3gpp.org/ftp/tsg_ran/WG1_RL1/TSGR1_98/Docs/RI-1909254.zip [retrieved on Aug. 17, 2019] Section 4.

\* cited by examiner

FEEDBACK FOR SIDELINK TRANSMISSION

CROSS REFERENCE

The present application for patent claims the benefit of U.S. Provisional Patent Application No. 62/909,149 by NGUYEN et al., entitled "FEEDBACK FOR SIDELINK TRANSMISSION," filed Oct. 1, 2019, assigned to the assignee hereof, and expressly incorporated by reference herein.

BACKGROUND

The following relates generally to wireless communications, and more specifically to feedback for sidelink transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, multiple UEs may communicate with each other over a sidelink channel. For example, the sidelink channel may include device-to-device (D2D) communications, vehicle-to-vehicle (V2V) communications, vehicle-to-everything (V2X) communications, etc. Additionally, the UEs may share resources in the sidelink channel, such that as more UEs enter the wireless communications system and attempt to use the sidelink channel, contention for the shared resources may increase and one or more sidelink transmissions between the UEs may be impacted. Efficient techniques are desired for ensuring quality of service (QoS) for the communications over the sidelink channel (e.g., sidelink communications) as the wireless communications system gets congested (e.g., as more UEs contend for the shared resources).

SUMMARY

The described techniques relate to improved methods, systems, devices, and apparatuses that support feedback for sidelink transmissions. Generally, the described techniques provide for a first user equipment (UE) (e.g., a transmitting UE) to transmit a sidelink data transmission to a second UE (e.g., a receiving UE) on a sidelink channel, where the second UE then transmits a sidelink channel congestion indicator (e.g., congestion index) in a feedback message after receiving the sidelink data transmission. Accordingly, the first UE may then adapt one or more sidelink parameters (e.g., sidelink transmission operation parameters, sidelink operation parameters, etc.) based on the sidelink channel congestion indicator. For example, the first UE may adjust a feedback distance (e.g., a distance between UEs where feedback is expected or transmitted, a reference signal received power (RSRP) measurement, etc.) or additional sidelink operation parameters based on the sidelink channel congestion indicator indicating that a packet error rate (PER) and/or bit rate is high or low at a current feedback distance.

In some cases, the first UE may receive multiple feedback messages and sidelink channel congestion indicators from respective receiving UEs and may aggregate (e.g., average) the multiple feedback messages into a single congestion index. Subsequently, the first UE may report the single congestion index to an upper layer, broadcast the aggregated multiple feedback messages (e.g., an aggregated report) to other transmitting UEs, report the aggregated multiple feedback messages to application layers, or a combination thereof. Additionally, the second UE (e.g., and other receiving UEs) may transmit the feedback message with the sidelink channel congestion indicator periodically, where the periodicity for transmitting the feedback message is configured by the first UE, derived from signaling, event driven, configured by the network (e.g., via network signaling, preconfigured in the UE, etc.), or a combination thereof. In some cases, the first UE and the second UE may communicate based on a connectionless multicast configuration (e.g., the first UE is unaware of the second UE and other receiving UEs prior to transmitting sidelink data transmission via a multicast transmission), where the sidelink data transmission is a connectionless sidelink multicast data transmission.

A method of wireless communications by a first UE is described. The method may include transmitting a sidelink data transmission to a second UE via a sidelink channel, receiving, from the second UE via the sidelink channel, a sidelink channel congestion indicator (e.g., congestion index), and communicating with the second UE via the sidelink channel in accordance with a sidelink operation parameter (e.g., sidelink parameter, sidelink transmission operation parameter, etc.) that is adjusted based on the sidelink channel congestion indicator.

An apparatus for wireless communications by a first UE is described. The apparatus may include a processor, memory coupled with the processor, and instructions stored in the memory. The instructions may be executable by the processor to cause the apparatus to transmit a sidelink data transmission to a second UE via a sidelink channel, receive, from the second UE via the sidelink channel, a sidelink channel congestion indicator, and communicate with the second UE via the sidelink channel in accordance with a sidelink operation parameter that is adjusted based on the sidelink channel congestion indicator.

Another apparatus for wireless communications by a first UE is described. The apparatus may include means for transmitting a sidelink data transmission to a second UE via a sidelink channel, receiving, from the second UE via the sidelink channel, a sidelink channel congestion indicator, and communicating with the second UE via the sidelink channel in accordance with a sidelink operation parameter that is adjusted based on the sidelink channel congestion indicator.

A non-transitory computer-readable medium storing code for wireless communications by a first UE is described. The code may include instructions executable by a processor to transmit a sidelink data transmission to a second UE via a sidelink channel, receive, from the second UE via the sidelink channel, a sidelink channel congestion indicator, and communicate with the second UE via the sidelink channel in accordance with a sidelink operation parameter that is adjusted based on the sidelink channel congestion indicator.

In some examples of the method, apparatuses, and non-transitory computer-readable medium described herein, communicating with the second UE via the sidelink channel may include operations, features, means, or instructions for communicating with the second UE via the sidelink channel in accordance with the sidelink operation parameter that may be one or more of a retransmission number parameter, a feedback distance parameter, a distance parameter, a control exclusion distance parameter, an RSRP parameter, a control exclusion RSRP parameter, or any combination thereof.

In some examples of the method, apparatuses, and non-transitory computer-readable medium described herein, communicating with the second UE via the sidelink channel may include operations, features, means, or instructions for retransmitting the sidelink data transmission to the second UE via the sidelink channel based on the sidelink operation parameter.

Some examples of the method, apparatuses, and non-transitory computer-readable medium described herein may further include operations, features, means, or instructions for transmitting a congestion indicator configuration to the second UE via the sidelink channel, where the sidelink channel congestion indicator may be based on the congestion indicator configuration.

In some examples of the method, apparatuses, and non-transitory computer-readable medium described herein, transmitting the congestion indicator configuration may include operations, features, means, or instructions for transmitting the congestion indicator configuration to indicate a periodicity at which the second UE may report the sidelink channel congestion indicator.

In some examples of the method, apparatuses, and non-transitory computer-readable medium described herein, transmitting the congestion indicator configuration may include operations, features, means, or instructions for transmitting the congestion indicator configuration to indicate an event after detection of which the second UE may report the sidelink channel congestion indicator.

In some examples of the method, apparatuses, and non-transitory computer-readable medium described herein, the sidelink channel congestion indicator may be received in accordance with a congestion indicator configuration. In some examples of the method, apparatuses, and non-transitory computer-readable medium described herein, the first UE may be configured by a network device with the congestion indicator configuration or the first UE may be preconfigured with the congestion indicator configuration.

In some examples of the method, apparatuses, and non-transitory computer-readable medium described herein, transmitting the sidelink data transmission may include operations, features, means, or instructions for transmitting the sidelink data transmission that includes geolocation data for the first UE and one or more packet indexes of one or more packets included within the sidelink data transmission.

Some examples of the method, apparatuses, and non-transitory computer-readable medium described herein may further include operations, features, means, or instructions for receiving a feedback message for the sidelink data transmission that includes geolocation data for the second UE and an indication of one or more packets received within a time interval, where the communicating with the second UE via the sidelink channel may be based on the feedback message.

Some examples of the method, apparatuses, and non-transitory computer-readable medium described herein may further include operations, features, means, or instructions for adjusting the sidelink operation parameter by adjusting a feedback distance threshold based on the sidelink channel congestion indicator, where the communicating via the sidelink channel may be based on a distance between the first UE and the second UE satisfying the adjusted feedback distance threshold.

Some examples of the method, apparatuses, and non-transitory computer-readable medium described herein may further include operations, features, means, or instructions for adjusting the sidelink operation parameter by adjusting one or more of a feedback distance threshold, a control exclusion range threshold, an input data rate, or any combination thereof, based on the sidelink channel congestion indicator, where the communicating with the second UE via the sidelink channel may be based on the adjusting.

Some examples of the method, apparatuses, and non-transitory computer-readable medium described herein may further include operations, features, means, or instructions for receiving, from the second UE via the sidelink channel, a feedback message providing an indication of one or more packets received within a time interval, and generating a corrected indication of the one or packets received within the time interval based on processing the feedback message to determine that the second UE did not receive one or more additional packets, where the communicating with the second UE via the sidelink channel may be based on the corrected feedback message.

Some examples of the method, apparatuses, and non-transitory computer-readable medium described herein may further include operations, features, means, or instructions for receiving, via the sidelink channel, a first feedback message for the sidelink data transmission from the second UE and at least a second feedback message from at least a third UE, determining aggregate feedback based on the first feedback message and at least the second feedback message, and adjusting the sidelink operation parameter based on the aggregate feedback, where the communicating with the second UE via the sidelink channel may be based on the adjusting.

Some examples of the method, apparatuses, and non-transitory computer-readable medium described herein may further include operations, features, means, or instructions for receiving, via the sidelink channel, a first feedback message for the sidelink data transmission from the second UE and at least a second feedback message from at least a third UE, determining an aggregate multicast PER, an aggregate multicast bit rate, or both, at a set of different distances based on the first feedback message and at least the second feedback message, and adjusting the sidelink operation parameter based on the aggregate multicast PER, the aggregate multicast bit rate, or both, where the communicating with the second UE via the sidelink channel may be based on the adjusting.

Some examples of the method, apparatuses, and non-transitory computer-readable medium described herein may further include operations, features, means, or instructions for receiving a combined feedback package from the second UE that includes a first feedback message corresponding to the sidelink data transmission and second feedback message for at least one additional wireless device, and parsing the first feedback message from the combined feedback package, where the communicating with the second UE via the sidelink channel may be based on the first feedback message.

In some examples of the method, apparatuses, and non-transitory computer-readable medium described herein, the combined feedback package includes a receiver side congestion index for at least one quality of service class.

Some examples of the method, apparatuses, and non-transitory computer-readable medium described herein may further include operations, features, means, or instructions for receiving, from the second UE via the sidelink channel, a feedback message for the sidelink data transmission that includes one or more of an identifier of the first UE, a PER, a bit rate, a feedback period start, a feedback period end, a packet identifier of a first packet received within a period, a packet identifier of a last packet received within a period, position data for the second UE, orientation data for the second UE, speed data of the second UE, a distance between the first UE and the second UE, or any combination thereof, where the communicating with the second UE via the sidelink channel may be based on the feedback message.

Some examples of the method, apparatuses, and non-transitory computer-readable medium described herein may further include operations, features, means, or instructions for receiving a medium access control (MAC) control element (CE) that includes a feedback message for the sidelink data transmission, where the communicating with the second UE via the sidelink channel may be based on the feedback message.

Some examples of the method, apparatuses, and non-transitory computer-readable medium described herein may further include operations, features, means, or instructions for receiving, from the second UE, an uplink data transmission that includes a feedback message for the sidelink data transmission, where the communicating with the second UE via the sidelink channel may be based on the feedback message.

Some examples of the method, apparatuses, and non-transitory computer-readable medium described herein may further include operations, features, means, or instructions for receiving, from the second UE, a feedback message for the sidelink data transmission, the feedback message including the sidelink channel congestion indicator, where the communicating with the second UE via the sidelink channel may be based on the feedback message.

In some examples of the method, apparatuses, and non-transitory computer-readable medium described herein, transmitting the sidelink data transmission may include operations, features, means, or instructions for transmitting the sidelink data transmission as a connectionless sidelink multicast data transmission.

A method of wireless communications by a first UE is described. The method may include monitoring a sidelink channel for a sidelink data transmission from a second UE, transmitting, to the second UE via the sidelink channel, a sidelink channel congestion indicator, and communicating with the second UE via the sidelink channel in accordance with a sidelink operation parameter that is adjusted based on the sidelink channel congestion indicator.

An apparatus for wireless communications by a first UE is described. The apparatus may include a processor, memory coupled with the processor, and instructions stored in the memory. The instructions may be executable by the processor to cause the apparatus to monitor a sidelink channel for a sidelink data transmission from a second UE, transmit, to the second UE via the sidelink channel, a sidelink channel congestion indicator, and communicate with the second UE via the sidelink channel in accordance with a sidelink operation parameter that is adjusted based on the sidelink channel congestion indicator.

Another apparatus for wireless communications by a first UE is described. The apparatus may include means for monitoring a sidelink channel for a sidelink data transmission from a second UE, transmitting, to the second UE via the sidelink channel, a sidelink channel congestion indicator, and communicating with the second UE via the sidelink channel in accordance with a sidelink operation parameter that is adjusted based on the sidelink channel congestion indicator.

A non-transitory computer-readable medium storing code for wireless communications by a first UE is described. The code may include instructions executable by a processor to monitor a sidelink channel for a sidelink data transmission from a second UE, transmit, to the second UE via the sidelink channel, a sidelink channel congestion indicator, and communicate with the second UE via the sidelink channel in accordance with a sidelink operation parameter that is adjusted based on the sidelink channel congestion indicator.

In some examples of the method, apparatuses, and non-transitory computer-readable medium described herein, communicating with the second UE via the sidelink channel may include operations, features, means, or instructions for communicating with the second UE via the sidelink channel in accordance with the sidelink operation parameter that may be one or more of a retransmission number parameter, a feedback distance parameter, a distance parameter, a control exclusion distance parameter, an RSRP parameter, a control exclusion RSRP parameter, or any combination thereof.

In some examples of the method, apparatuses, and non-transitory computer-readable medium described herein, communicating with the second UE via the sidelink channel may include operations, features, means, or instructions for monitoring for a retransmission of the sidelink data transmission from the second UE via the sidelink channel based on the sidelink operation parameter.

Some examples of the method, apparatuses, and non-transitory computer-readable medium described herein may further include operations, features, means, or instructions for receiving a congestion indicator configuration from the second UE via the sidelink channel, where the sidelink channel congestion indicator may be transmitted to the second UE based on the congestion indicator configuration.

In some examples of the method, apparatuses, and non-transitory computer-readable medium described herein, receiving the congestion indicator configuration may include operations, features, means, or instructions for receiving the congestion indicator configuration that indicates a periodicity at which the first UE may report the sidelink channel congestion indicator.

In some examples of the method, apparatuses, and non-transitory computer-readable medium described herein, receiving the congestion indicator configuration may include operations, features, means, or instructions for receiving the congestion indicator configuration that indicates an event after detection of which the first UE may report the sidelink channel congestion indicator.

In some examples of the method, apparatuses, and non-transitory computer-readable medium described herein, the sidelink channel congestion indicator may be received in accordance with a congestion indicator configuration. In some examples of the method, apparatuses, and non-transitory computer-readable medium described herein, the first UE may be configured by a network device with the congestion indicator configuration or the first UE may be preconfigured with the congestion indicator configuration.

In some examples of the method, apparatuses, and non-transitory computer-readable medium described herein, monitoring the sidelink channel for the sidelink data transmission may include operations, features, means, or instructions for receiving the sidelink data transmission that includes geolocation data for the first UE and one or more packet indexes of one or more packets included within the sidelink data transmission.

Some examples of the method, apparatuses, and non-transitory computer-readable medium described herein may further include operations, features, means, or instructions for transmitting a feedback message for the sidelink data transmission that includes geolocation data for the first UE and an indication of one or more packets received within a time interval, where the communicating with the second UE via the sidelink channel may be based on the feedback message.

Some examples of the method, apparatuses, and non-transitory computer-readable medium described herein may further include operations, features, means, or instructions for adjusting the sidelink operation parameter by adjusting a feedback distance threshold based on the sidelink channel congestion indicator, and transmitting a feedback message that negatively acknowledges the sidelink data transmission to trigger retransmission of the sidelink data transmission by the second UE based on a distance between the first UE and the second UE satisfying the adjusted feedback distance threshold.

Some examples of the method, apparatuses, and non-transitory computer-readable medium described herein may further include operations, features, means, or instructions for adjusting the sidelink operation parameter by adjusting one or more of a feedback distance threshold, a control exclusion range threshold, an input data rate, or any combination thereof, based on the sidelink channel congestion indicator, where the communicating with the second UE via the sidelink channel may be based on the adjusting.

Some examples of the method, apparatuses, and non-transitory computer-readable medium described herein may further include operations, features, means, or instructions for transmitting a combined feedback package to the second UE that includes a first feedback message corresponding to the sidelink data transmission and at least a second feedback message for at least one additional wireless device.

In some examples of the method, apparatuses, and non-transitory computer-readable medium described herein, the combined feedback package includes a receiver side congestion index for at least one quality of service class.

Some examples of the method, apparatuses, and non-transitory computer-readable medium described herein may further include operations, features, means, or instructions for transmitting, to the second UE via the sidelink channel, a feedback message for the sidelink data transmission that includes one or more of an identifier of the second UE, a PER, a bit rate, a feedback period start, a feedback period end, a packet identifier of a first packet received within a period, a packet identifier of a last packet received within a period, position data for the first UE, orientation data for the first UE, speed data of the first UE, a distance between the first UE and the second UE, or any combination thereof, where the communicating with the second UE via the sidelink channel may be based on the feedback message.

Some examples of the method, apparatuses, and non-transitory computer-readable medium described herein may further include operations, features, means, or instructions for transmitting a MAC CE that includes a feedback message for the sidelink data transmission, where the communicating with the second UE via the sidelink channel may be based on the feedback message.

Some examples of the method, apparatuses, and non-transitory computer-readable medium described herein may further include operations, features, means, or instructions for transmitting, to the second UE, an uplink data transmission that includes a feedback message for the sidelink data transmission, where the communicating with the second UE via the sidelink channel may be based on the feedback message.

Some examples of the method, apparatuses, and non-transitory computer-readable medium described herein may further include operations, features, means, or instructions for transmitting, to the second UE, a feedback message for the sidelink data transmission that includes the sidelink channel congestion indicator, where the communicating with the second UE via the sidelink channel may be based on the feedback message.

In some examples of the method, apparatuses, and non-transitory computer-readable medium described herein, the sidelink data transmission may be a connectionless sidelink multicast data transmission.

DETAILED DESCRIPTION

Figure 1:
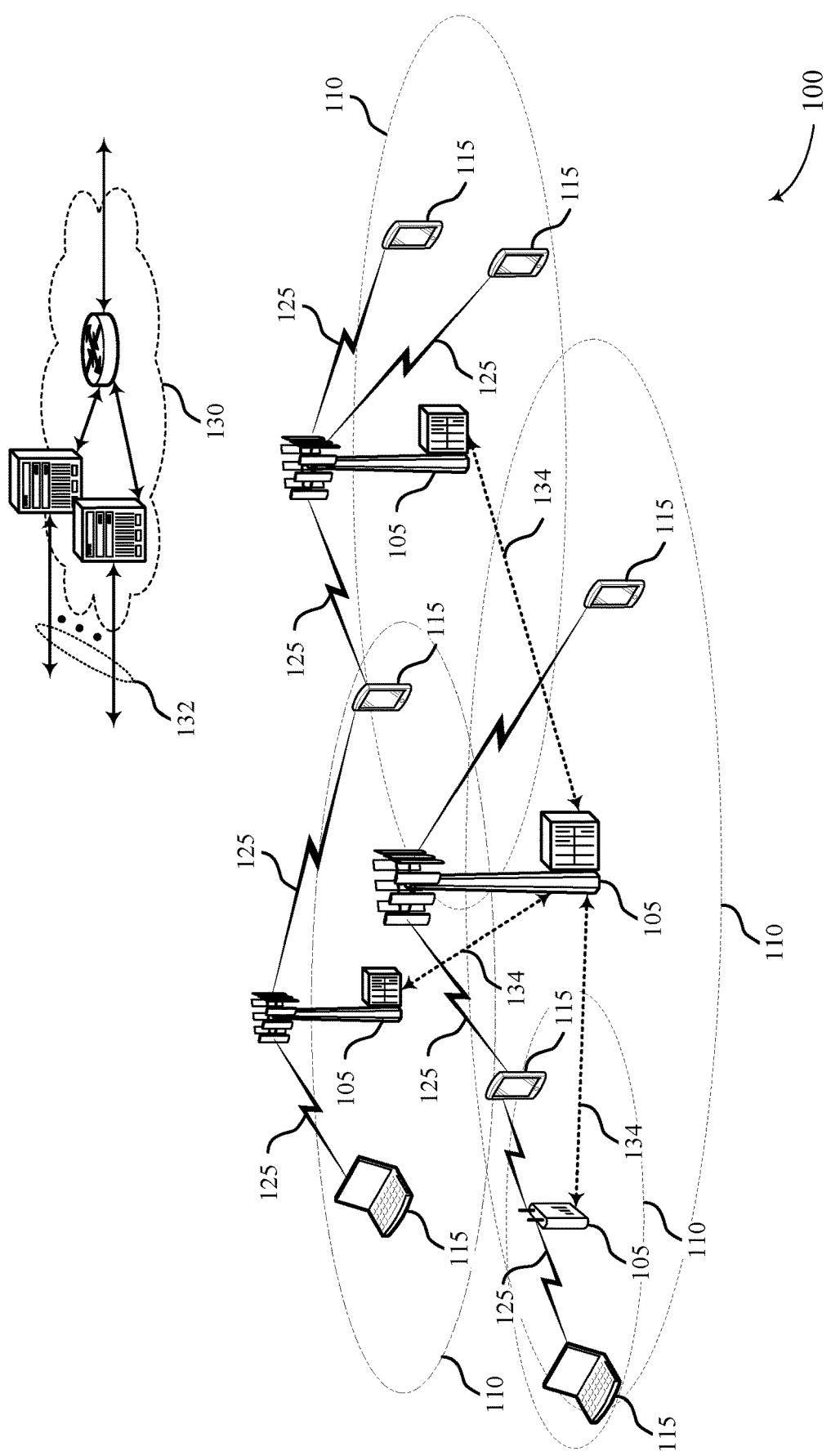
FIG. 1 illustrates an example of a system for wireless communications that supports feedback for sidelink transmissions in accordance with aspects of the present disclosure.

The described techniques provide for a receiver user equipment (UE) communicating with a transmitter UE in a sidelink channel to report a congestion indicator (e.g., congestion index, sidelink channel congestion indicator, etc.) to the transmitter UE and/or additional transmitter UEs, where the transmitter UE(s) may then adjust one or more sidelink operation parameters (e.g., sidelink transmission operation parameters) based on the reported congestion indicator.

In sidelink wireless communications systems, wireless devices may share a same set of resources for sidelink communication. Accordingly, for different use cases in sidelink wireless communications systems (e.g., device-to-device (D2D) communications, vehicle-to-vehicle (V2V) communications, vehicle-to-everything (V2X) communications, etc.), a quality of service (QoS) may be ensured by resource exclusion and/or distance-based exclusion. In resource exclusion, a UE may avoid using same resources reserved by another UE if the distance between the UEs is under a resource exclusion threshold value ($Thresh_{RE}$), a measured signal quality (e.g., reference signal received power (RSRP)) is above the resource exclusion threshold value ($Thresh_{RE}$), etc. Further, retransmissions may be permitted to the at least one UE that did not successfully receive a packet and the distance/measured signal quality between UEs is under a feedback threshold value ($Thresh_{FB}$). Conventional systems may rely on determinations by transmitters (e.g., transmitting UEs) of whether a sidelink channel is congested. This determination made by the transmitters may cause fairness issues as a first transmitter may determine that a sidelink channel is congested and stop transmitting, whereas a nearby second transmitter may determine that the sidelink channel is not congested at a time shortly after the first transmitter halted transmission. Additionally or alternatively, this determination may lead to inaccuracy issues, where the transmitter may determine that the channel is congested but the receivers can still receive the sidelink communications or the transmitter may determine that the channel is not congested but the receiver cannot receive the sidelink communication.

As described herein, to mitigate these issues, receiver UEs may report a congestion indicator (e.g., congestion index) to one or more transmitter UEs. Subsequently, in some cases, the transmitter UEs may adjust the distance-based feedback threshold ($Thresh_{FB}$, or a different sidelink operation parameter) based on the congestion indicator received from one or more receiver UEs to manage congestion of a sidelink channel. For example, the transmitter UE may use the adjusted threshold for determining whether to make retransmissions to a particular receiver that did not successfully receive a prior transmission. If a distance between the transmitter UE and receiver UE is less than the distance-based feedback threshold, then the transmitter UE may retransmit. Additionally or alternatively, if the distance between the transmitter UE and receiver UE exceeds the distance-based feedback threshold, the receiver UE may be too far away, and the transmitter UE may skip retransmitting the prior transmission as the receiver UE is still unlikely to successfully receive the retransmission. In some cases, the transmitter UE may configure the receiver UE with how often and when to report a congestion indicator.

Aspects of the disclosure are initially described in the context of a wireless communications system. Additionally, aspects of the disclosure are illustrated by an additional wireless communications system and a process flow. Aspects of the disclosure are further illustrated by and described with reference to apparatus diagrams, system diagrams, and flowcharts that relate to feedback for sidelink transmissions.

FIG. 1 illustrates an example of a wireless communications system 100 that supports feedback for sidelink transmissions in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or D2D protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In sidelink communications, multiple UEs 115 may communicate with each other over a sidelink channel. The sidelink channel may include time and frequency resources reserved in the network for transmissions between UEs 115. For example, a base station 105 may configure a set of time-frequency resources that UEs 115 can use for sidelink transmissions to/from other UEs 115. In some cases, the sidelink channel may support different types of communications between UEs 115, such as D2D, P2P, V2V, V2X, etc.

For the different sidelink communication types, QoS may be ensured by a resource exclusion procedure and/or a distance-based feedback procedure. For example, for the resource exclusion procedure, a UE 115 may avoid using same resources reserved by another UE 115 (e.g., reserved for a sidelink retransmission) if the distance (e.g., physical distance of how far apart the UEs 115 are from each other) and/or a signal power measurement (e.g., RSRP measurement) between the UEs 115 is a under a threshold value for the resource exclusion procedure ($Thresh_{RE}$). Additionally or alternatively, for the distance-based feedback procedure, if a UE 115 cannot receive a packet (e.g., a sidelink transmission) from another UE 115 and the distance/RSRP between the UEs 115 is under a threshold value for the distance-based feedback procedure ($Thresh_{FB}$), a retransmission of the packet may be sent to the UE 115 based on the distance/RSRP between the UEs 115 being under the threshold value.

Conventionally, for sidelink communications, when a system becomes congested (e.g., a high number of UEs 115 contesting for a same set of resources configured for the sidelink communications), a transmitter UE 115 may throttle a bit rate for sending sidelink transmissions (e.g., reduce the speed of the sidelink transmissions which may reduce the number of resources used, number of retransmissions sent, etc.). Additionally or alternatively, a receiver UE 115 may reduce a packet reception rate (e.g., reduce the number of packets needed to be received to indicate whether a transmission is successfully received). For example, with higher packet reception rates (e.g., a higher number of packets are needed to be received to indicate the transmission is successfully received), a higher number of feedback messages may be transmitted by the receiver UEs 115 and/or a higher number of retransmissions from the transmitter UEs 115 may be sent, thereby increasing the congestion. In some cases, the UEs 115 may also reduce a range for a packet error rate (PER) expectation (e.g., how many packets can be unsuccessfully received or decoded, while a transmission is still determined to be successfully received).

However, these conventional systems may rely on determinations by transmitters (e.g., transmitting UEs 115) of whether a sidelink channel is congested. In some cases, the transmitter UE may use a constant bit rate (CBR) approach (e.g., as defined for dedicated short-range communications (DSRC), LTE V2X, WiFi, etc.) for collecting the congestion information (as defined for dedicated short-range communications (DSRC), LTE V2X, etc.). Additionally or alternatively, the transmitter UE may use an amount of observed reserved resource, an amount of packets dropped due to not having an available resource, a number of transmissions realized per packet, or a combination thereof to determine the congestion of a channel in the network (e.g., sidelink channel). This determination made by the transmitters may cause fairness issues as a first transmitter may determine that a sidelink channel is congested and stop transmitting, whereas a nearby second transmitter may determine that the sidelink channel is not congested at a time shortly after the first transmitter halted transmission. Additionally, some of the methods described above where the transmitter UE determines the congestion of a channel may not differentiate between a priority of the data (e.g., sidelink data) transmitted or QoS for the data when seeing the busyness (e.g., congestion) of the channel (e.g., time-frequency resources).

Wireless communications system 100 may support efficient techniques for collecting a network congestion index (e.g., a sidelink channel congestion indicator) and reporting the network congestion index to an application layer, where the application layer decides to throttle a bit rate and/or reduce a QoS expectation. For example, a new type of congestion index (e.g., a sidelink channel congestion index) may be defined that can be collected at receiver UEs 115, and the receiver UEs 115 may then report the congestion index to transmitter UEs 115. Subsequently, the transmitter UEs 115 may aggregate congestion index reports from multiple receiver UEs 115 (e.g., received via multicast or broadcast transmissions). In some cases, the transmitter UEs 115 may report the aggregated congestion index reports to an upper layer, broadcast the aggregated congestion index reports to other transmitter UEs 115, report the received aggregated congestion index reports to application layers, or a combination thereof. The transmitter UEs 115 and/or application layer may then adjust one or more sidelink transmission operation parameters (e.g., sidelink operation parameters) based on the aggregated congestion index reports (e.g., increase or decrease a feedback distance/range to decrease or increase a number of retransmission attempts for negative acknowledgement (NACK) feedback messages). For example, the transmitter UEs 115 and/or application layer may adjust threshold values (e.g., Thresh$_{FB}$, or adjust a different sidelink transmission operation parameter) to lessen how much feedback is transmitted by the receiver UEs 115 and a number of retransmissions, thereby lessening congestion in the system.

Figure 2:
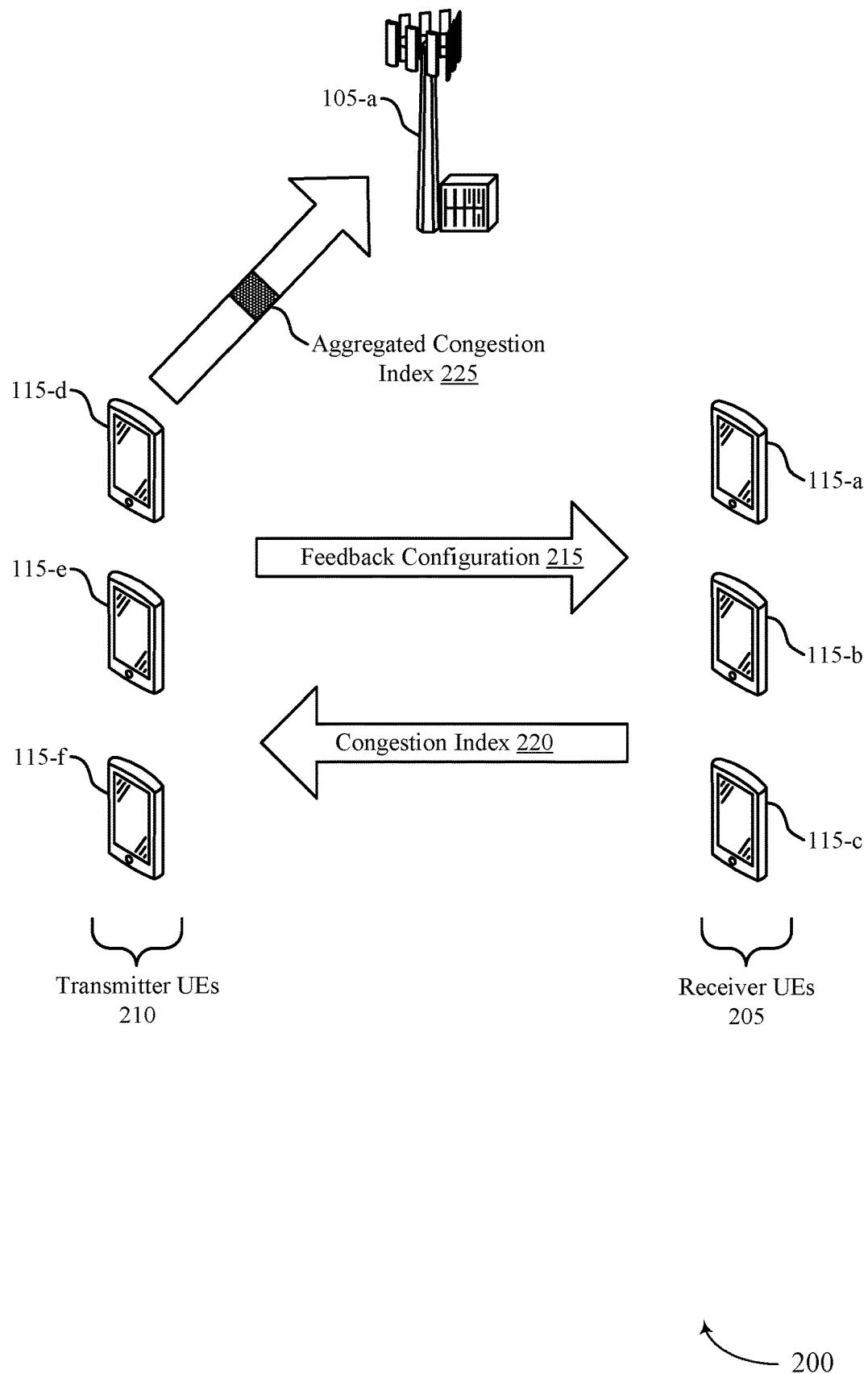
FIG. 2 illustrates an example of a wireless communications system in accordance with aspects of the present disclosure.

FIG. 2 illustrates an example of a wireless communications system 200 that supports feedback for sidelink transmissions in accordance with aspects of the present disclosure. In some examples, wireless communications system 200 may implement aspects of wireless communications system 100. Wireless communications system 200 may include one or more UEs 115 and a base station 105-a, which may be examples of corresponding UEs 115 and a base station 105 as described above with reference to FIG. 1. In some cases, wireless communications system 200 may support sidelink communications between the UEs 115. For example, the UEs 115 may include one or more receiver UEs 205 and one or more transmitter UEs 210. As shown, the receiver UEs 205 may include a UE 115-a, a UE 115-b, and a UE 115-c, and the transmitter UEs 210 may include a UE 115-d, a UE 115-e, and a UE 115-f. Accordingly, the receiver UEs 205 and the transmitter UEs 210 may communicate over a sidelink channel configured for sidelink transmissions. For example, base station 105-a may configure a set of time-frequency resources (e.g., sidelink channel) that UEs 115 can use for sidelink transmissions to/from other UEs 115.

In some cases, wireless communications system 200 may also support a connectionless multicast configuration for the sidelink communications between the UEs 115. For example, the connectionless multicast configuration may include no set up done prior to the UEs 115 sending/receiving sidelink transmissions. The receiver UEs 115 may know some or all of the transmitter UEs 210 nearby and may monitor for sidelink packets from some or all nearby transmitter UEs 210. In some cases, the receiver UEs 205 may identify a time window for monitoring for/receiving the sidelink packets and remain in an awake state during this time window to monitor for and/or receive a sidelink packet from a transmitter UE 115. Additionally, a receiver UE 115 may have connections with multiple transmitter UEs 115. Similarly, a transmitter UE 115 may have connection with multiple receiver UEs 115. However, a transmitter UE 115 may not know which receiver UEs 115 are in wireless communications system 200 prior to transmitting a sidelink packet (e.g., a priori). In some cases, a receiver UE 115 may determine an interest in a sidelink packet based on a distance between the receiver UE 115 and the transmitter UE 115 transmitting the sidelink packet.

In some cases, a transmitter UE 115 may transmit a feedback configuration 215 to one or more receiver UEs 115 (e.g., based on the connectionless multicast configuration). For example, feedback configuration 215 may indicate for the receiver UEs 205 to send periodic feedback (e.g., acknowledgement (ACK)/NACK feedback). The periodicity of the feedback (e.g., when the receiver UEs 205 are to transmit feedback) may be configured or preconfigured. For example, the periodicity may be configured by the network (e.g., base station 105-a), via an Internet connection, etc., or may even be configured by a transmitter UE 115 (e.g., in feedback configuration 215). In some cases, the receiver UEs 205 may be preconfigured with the periodicity based on factory settings programmed into the UEs 115 when manufactured (e.g., where the periodic feedback is to be transmitted when communicating in unlicensed bands, such as for sidelink communications). Additionally or alternatively, the periodicity may be derived implicitly by the receiver UEs 205 from a 5G QoS indicator (5QI) and/or a signaled feedback distance. Additionally or alternatively, the periodicity may be event driven. For example, when a measured QoS is lower than a configured limit (e.g., a receiver UE misses more than 10% of sidelink packets transmitted by a transmitter UE 115), the receiver UEs 205 may transmit the feedback message.

When transmitting the periodic feedback, the receiver UEs 205 may include a transmitter identification for a transmitter UE 115 (e.g., indicating for which transmitter UE 115 the feedback is intended), a PER of sidelink packets received from the transmitter UE 115 (e.g., how many sidelink packets are unsuccessfully received/decoded), and a bit rate of the received sidelink packets. Additionally, the periodic feedback may include a start of the feedback period for which the feedback is transmitted (e.g., the beginning of a time window for which the feedback is given for received sidelink packets during the time window), an end of the feedback period, an identification of a first sidelink packet received in the feedback period (e.g., indicate an earliest packet received within a time window), and an identification of a last sidelink packet received in the feedback period (e.g., indicate a latest packet received within a time window). In some cases, the information about the sidelink packets (e.g., PER, bit rate, sidelink packet identifications, etc.) and the information about the feedback period may be referred to as a congestion index 220 (e.g., a sidelink channel congestion indicator). For example, based on the congestion index 220 with the information about the sidelink packets and the feedback period, the transmitter UE 115 may determine a congestion level in the system. In some cases, a high PER and bit rate may indicate that a high number of sidelink packets are not being successfully received by the receiver UE 115, for example, due to high congestion in the system.

Additionally, the periodic feedback may also include information about the receiver UE 115, such as a position (e.g., geolocation) of the receiver UE 115, an orientation of the receiver UE 115, a speed of the receiver UE 115, an identification of the receiver UE 115, and a distance between the receiver UE 115 and the transmitter UE 115. The information about the receiver UE 115 may enable the transmitter UE 115 to determine whether the receiver UE 115 is moving closer or farther away from the transmitter UE 115.

In some cases, the receiver UE 115 may transmit the periodic feedback information (e.g., including the congestion index 220, a sidelink channel congestion indicator, etc.) in a MAC control element (CE). For example, the receiver UE 115 may piggyback the periodic feedback with data in the MAC CE if a range requirement for the periodic feedback is the same as, or similar to, a range requirement for the data. Additionally or alternatively, feedbacks to different transmitter UEs 115 may be combined in one broadcast feedback package. Accordingly, the receiver UE 115 may still associate a transmitter identification with each periodic feedback in the combined broadcast feedback package, such that a transmitter UE 115 may search for its own identification in the package to determine if any periodic feedback in the combined broadcast feedback package is intended for the transmitter UE 115 and, as such, may decode and receive the corresponding periodic feedback. With the combined broadcast feedback package, the information about the receiver UE 115 (e.g., position, orientation, speed of the receiver UE 115, etc.) may be shared to all of the transmitter UEs 210 prior to the combined broadcast feedback package transmission to save payload size. In some cases, the combined broadcast feedback package may also include a normal transmission side congestion index (e.g., per QoS class), such that this information can be crowdsourced to get a fair distributed congestion control mechanism. The normal transmission side congestion index may be an example of a sidelink channel congestion indicator as described herein. Additionally or alternatively, the periodic feedbacks to the different transmitter UEs 115 may also be transmitted separately to each transmitter UE 115 in, for example, a unicast manner. For example, the receiver UE 115 may transmit the periodic feedback in the unicast manner based on an importance or priority of the transmitter UE 115 and the sidelink transmission transmitted by the transmitter UE 115 (e.g., higher priority sidelink transmissions may necessitate unicast feedback).

Subsequently, in some cases, after receiving the periodic feedback (e.g., including the congestion index 220) from a receiver UE 115, a transmitter UE 115 may correct the received feedback information. For example, the transmitter UE 115 may know which and how many sidelink packets were transmitted during the feedback period (e.g., a time window, time interval, etc.) indicated by the receiver UE 115. As such, if the transmitter UE 115 determines that more sidelink packets were transmitted during the feedback period than are indicated by the identifications of the first and last sidelink packets received by the receiver UE 115 (e.g., as indicated in the periodic feedback), the transmitter UE 115 may infer that the control for those missing sidelink packets were lost and may adjust the reported PER and bit rate in the periodic feedback accordingly.

As an example, the receiver UE 115 may report a first received sidelink packet in the feedback period has an identification of '4' and a last received sidelink packet in the feedback period has an identification of '20'. The transmitter UE 115 may then determine that based on the reported start and end of the feedback period from the receiver UE 115 that a first sidelink packet was transmitted in that feedback period with an identification of '2' and a last sidelink packet was transmitted with an identification of '21'. As such, the transmitter UE 115 may determine that the receiver UE 115 missed at least three packets (e.g., may be more packets in between the first and last received sidelink packets were also missed) and may adjust the reported PER and bit rate of the received sidelink packets reported by the receiving UE 115 to reflect these additional missed sidelink packets.

In some cases, a transmitter UE 115 may aggregate feedback information from multiple receiver UEs 115 to get a multicast PER and bitrate at different distances. For example, the transmitter UE 115 may take an average of all the received feedback information (e.g., average PER and bit rate) from the receiver UEs 205. Additionally or alternatively, the transmitter UE 115 may aggregate all of the feedback information from the multiple receiver UEs 115 differently (e.g., weighted average, median, etc.) based on the type of sidelink data transmitted to the respective receiver UEs 115, a priority of the sidelink data, etc. After aggregating the feedback information, the transmitter UE 115 may report the aggregated feedback to an upper layer (e.g., RRC layer), broadcast the aggregated feedback to other transmitter UEs 115, report the aggregated feedback to an application layer, or a combination thereof. For example, the transmitter UE 115 may transmit an aggregated congestion index 225 (e.g., aggregated sidelink channel congestion indicator) to base station 105-$a$ (e.g., upper layer, application layer, etc.). The aggregated feedback may include the aggregated congestion index 225 based on the aggregated feedback representing a congestion level in the system (e.g., through the reported/adjusted PER, bit rate, etc.).

The transmitter UEs 115 and/or application layer may then adjust one or more sidelink transmission operation parameters (e.g., sidelink operation parameter) based on the aggregated feedback and aggregated congestion index 225. As one example, the aggregated feedback and aggregated congestion index 225 may indicate that the receiving UEs 115 are experiencing an average error rate (e.g., average PER) of 20% (e.g., 20% of sidelink packets are incorrectly received/decoded), while a target/threshold error rate is 10%. Accordingly, the transmitter UE 115 and/or application layer (e.g., base station 105-$a$) may determine the high error rate is caused by a high congestion level. As such, the transmitter UE 115 and/or application layer may decrease a feedback distance (e.g., $Thresh_{FB}$, a feedback distance threshold, a feedback range, etc.) based on the estimated PER and bit rate being high at the current feedback distance, thereby reducing the number of retransmissions sent and lessening the congestion. In some cases, the transmitter UE 115 and/or application layer may adjust other sidelink transmission operation parameters (e.g., other sidelink operation parameters) based on the identified high congestion, such as a number of retransmissions that can be attempted, an expected communication range, a control exclusion distance/RSRP, input data rate, etc. For example, the adjusted sidelink transmission operation parameters may increase a range of acceptable sidelink transmissions, such that the receiver UE 115 transmits an ACK with the periodic feedback (e.g., resulting in fewer retransmissions sent as a result of NACKs). If the sidelink transmission still falls within the range of adjusted sidelink transmission operation parameters (e.g., the higher feedback distance, higher expected communication range, etc.), the receiver UE 115 may still transmit a NACK, and the periodic feedback may still indicate a high congestion level, resulting in the transmitter UE 115 and/or application layer to perform further mitigation (e.g., further increase the feedback distance threshold, $Thresh_{FB}$, expected communication range, adjust one or more sidelink transmission operation parameters, etc.).

Additionally or alternatively, in another example, the aggregated feedback and aggregated congestion index 225 may indicate that the receiving UEs 115 are experiencing an average error rate (e.g., average PER) of 5% (e.g., 5% of sidelink packets are incorrectly received/decoded), while a target/threshold error rate is still 10%. Accordingly, the transmitter UE 115 and/or application layer (e.g., base station 105-*a*) may determine the low error rate is caused by too conservative of a feedback distance (e.g., too high of a threshold value) and may increase the feedback distance (e.g., Thresh$_{FB}$, or adjust another sidelink operation parameter) based on the estimated PER and bit rate being low at the current feedback distance, thereby increasing the requirements to determine if a sidelink transmission is successfully received and decoded (e.g., more aggressive requirements). For example, the receiver UE 115 may transmit a NACK feedback more often, resulting in higher quality sidelink transmissions being sent to enable the receiver UE 115 to transmit an ACK.

Figure 3:
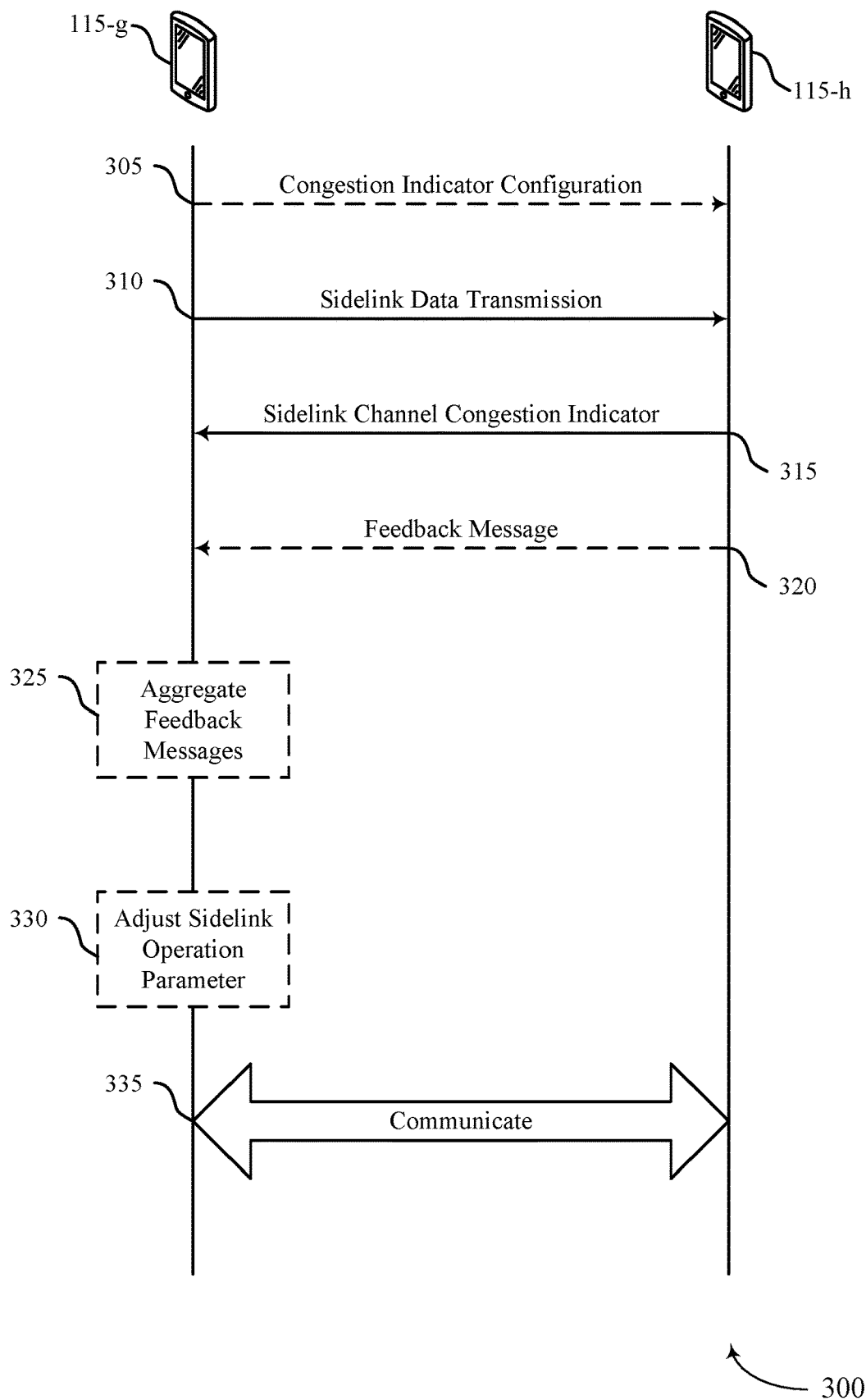
FIG. 3 illustrates an example of a process flow in accordance with aspects of the present disclosure.

FIG. 3 illustrates an example of a process flow 300 that supports feedback for sidelink transmissions in accordance with aspects of the present disclosure. In some examples, process flow 300 may implement aspects of wireless communications systems 100 and/or 200. Process flow 300 may include a UE 115-*g* and a UE 115-*h*, which may be examples of UEs 115 as described above with reference to FIGS. 1 and 2. As described herein, UE 115-*g* and UE 115-*h* may communicate over a sidelink channel, where UE 115-*g* may be referred to as a transmitter UE 115-*g* and UE 115-*h* may be referred to as a receiver UE 115-*h* (e.g., transmitter UE 115-*g* transmits sidelink data transmissions to receiver UE 115-*h*).

In the following description of the process flow 300, the operations between UE 115-*g* and UE 115-*h* may be transmitted in a different order than the exemplary order shown, or the operations performed by UE 115-*g* and UE 115-*h* may be performed in different orders or at different times. Certain operations may also be left out of the process flow 300, or other operations may be added to the process flow 300. It is to be understood that while UE 115-*g* and UE 115-*h* are shown performing a number of the operations of process flow 300, any wireless device may perform the operations shown.

At 305, UE 115-*g* may transmit a congestion indicator configuration to UE 115-*h* via a sidelink channel, where a sidelink channel congestion indicator (e.g., congestion index, sidelink congestion index, etc.) is based on the congestion indicator configuration. In some cases, UE 115-*g* may transmit the congestion indicator configuration to indicate a periodicity at which UE 115-*h* is to report the sidelink channel congestion indicator. Additionally or alternatively, UE 115-*g* may transmit the congestion indicator configuration to indicate an event after detection of which UE 115-*h* is to report the sidelink channel congestion indicator. In some cases, the congestion indicator configuration may be configured by a network device (e.g., a base station 105, the network, etc.), preconfigured for UE 115-*g* and UE 115-*h* (e.g., precoded within the UEs 115 when manufactured), or a combination thereof.

At 310, UE 115-*g* may transmit a sidelink data transmission to UE 115-*h* via the sidelink channel. In some cases, the sidelink channel may include time and frequency resources reserved in the network for transmissions between UEs 115. For example, a base station 105 may configure a set of time-frequency resources for a sidelink channel that UEs 115-*g* and 115-*h* can use for sidelink transmissions to/from other UEs 115. Additionally, UE 115-*g* may transmit the sidelink data transmission including geolocation data (e.g., position information) for the UE 115-*g* and one or more packet indexes (e.g., packet identifications) of one or more packets included within the sidelink data transmission. In some cases, UE 115-*g* may transmit the sidelink data transmission as a connectionless sidelink multicast data transmission.

Accordingly, UE 115-*h* may monitor the sidelink channel for the sidelink data transmission from UE 115-*g*. In some cases, UE 115-*h* may receive the sidelink data transmission that includes the geolocation data for UE 115-*g* and the one or more packet indexes of one or more packets included within the sidelink data transmission.

At 315, UE 115-*h* may transmit, to UE 115-*g* via the sidelink channel, a sidelink channel congestion indicator.

At 320, UE 115-*h* may transmit a feedback message for the sidelink data transmission including geolocation data for UE 115-*h* and an indication of one or more packets received within a time interval. In some cases, UE 115-*g* may receive, from UE 115-*h* via the sidelink channel, a feedback message for the sidelink data transmission that includes one or more of an identifier of UE 115-*g* (e.g., transmitter UE identification), a PER, a bit rate, a feedback period start, a feedback period end, a packet identifier of a first packet received within the feedback period, a packet identifier of a last packet received within the feedback period, position data for UE 115-*h*, orientation data for UE 115-*h*, speed data of UE 115-*h*, a distance between UE 115-*g* and UE 115-*h*, or any combination thereof.

In some cases, UE 115-*g* may receive a MAC CE that includes the feedback message for the sidelink data transmission. Additionally or alternatively, UE 115-*g* may receive, from UE 115-*g*, an uplink data transmission that includes the feedback message for the sidelink data transmission. In some cases, UE 115-*g* may receive, from UE 115-*h*, the feedback message for the sidelink data transmission, the feedback message including the sidelink channel congestion indicator.

At 325, UE 115-*g* may receive, via the sidelink channel, a first feedback message for the sidelink data transmission from UE 115-*h* and at least a second feedback message from an additional UE 115 (e.g., an additional receiver UE 115, more than one additional UE 115, etc.) and may determine aggregate feedback based on the first feedback message and at least the second feedback message. In some cases, UE 115-*g* may adjust a sidelink operation parameter based on the aggregate feedback.

Additionally or alternatively, UE 115-*g* may receive, via the sidelink channel, a first feedback message for the sidelink data transmission from UE 115-*h* and at least a second feedback message from an additional UE 115 (e.g., from multiple additional UEs 115) and may determine an aggregate multicast PER, an aggregate multicast bit rate, or both, at multiple different distances based on the first feedback message and at least the second feedback message. In some cases, UE 115-*g* may adjust the sidelink operation parameter based on the aggregate multicast PER, the aggregate multicast bit rate, or both.

In some cases, UE 115-*g* may receive a combined feedback package from UE 115-*h* that includes a first feedback message corresponding to the sidelink data transmission and at least a second feedback message for at least one additional wireless device (e.g., for an additional transmitter UE 115). Accordingly, UE 115-*g* may parse the first feedback message from the combined feedback package, where the combined feedback package includes a receiver side congestion index for at least one QoS class.

Additionally, in some cases, UE 115-*h* may transmit a combined feedback package to UE 115-*g* that includes a first feedback message corresponding to the sidelink data transmission and at least a second feedback message for at least one additional wireless device, where the combined feedback package includes a receiver side congestion index for at least one QoS class.

At 330, UE 115-*g* may adjust a sidelink operation parameter (e.g., sidelink transmission operation parameter) by adjusting a feedback distance threshold based on the sidelink channel congestion indicator, where communicating via the sidelink channel is based on a distance between UE 115-*g* and UE 115-*h* satisfying the adjusted feedback distance threshold. Additionally or alternatively, UE 115-*g* may adjust the sidelink operation parameter by adjusting one or more of a feedback distance threshold (e.g., an expected communication range threshold), a control exclusion range threshold, an input data rate, or any combination thereof, based on the sidelink channel congestion indicator.

In some cases, UE 115-*g* may receive, from UE 115-*h* via the sidelink channel, a feedback message providing an indication of one or more packets received within a time interval (e.g., or a NACK for the sidelink data transmission). Additionally, UE 115-*g* may generate a corrected indication of the one or more packets received within the time interval (e.g., corrected feedback message) based on processing the feedback message to determine that UE 115-*h* did not receive one or more additional packets.

At 335, UE 115-*g* may communicate with UE 115-*h* via the sidelink channel in accordance with the sidelink operation parameter (e.g., sidelink transmission operation parameter) that is adjusted based on the sidelink channel congestion indicator. In some cases, UE 115-*g* may communicate with UE 115-*h* via the sidelink channel in accordance with the sidelink operation parameter that is one or more of a retransmission number parameter, a feedback distance parameter, a distance parameter, a control exclusion distance parameter, an RSRP parameter, a control exclusion RSRP parameter, or any combination thereof. Additionally or alternatively, UE 115-*g* may retransmit the sidelink data transmission to UE 115-*h* via the sidelink channel based on the sidelink operation parameter. In some cases, UE 115-*h* may monitor for a retransmission of the sidelink data transmission from UE 115-*g* via the sidelink channel based on the sidelink operation parameter.

Additionally, UE 115-*h* may adjust the sidelink operation parameter by adjusting a feedback distance threshold based on the sidelink channel congestion indicator and may transmit a feedback message that negatively acknowledges the sidelink data transmission to trigger retransmission of the sidelink data transmission by UE 115-*g* based on a distance between UE 115-*g* and UE 115-*h* satisfying the adjusted feedback distance threshold.

In some cases, UE 115-*h* may adjust the sidelink operation parameter by adjusting one or more of a feedback distance threshold, a control exclusion range threshold, an input data rate, or any combination thereof, based on the sidelink channel congestion indicator, where the communicating with UE 115-*g* via the sidelink channel is based on the adjusting.

Figure 4:
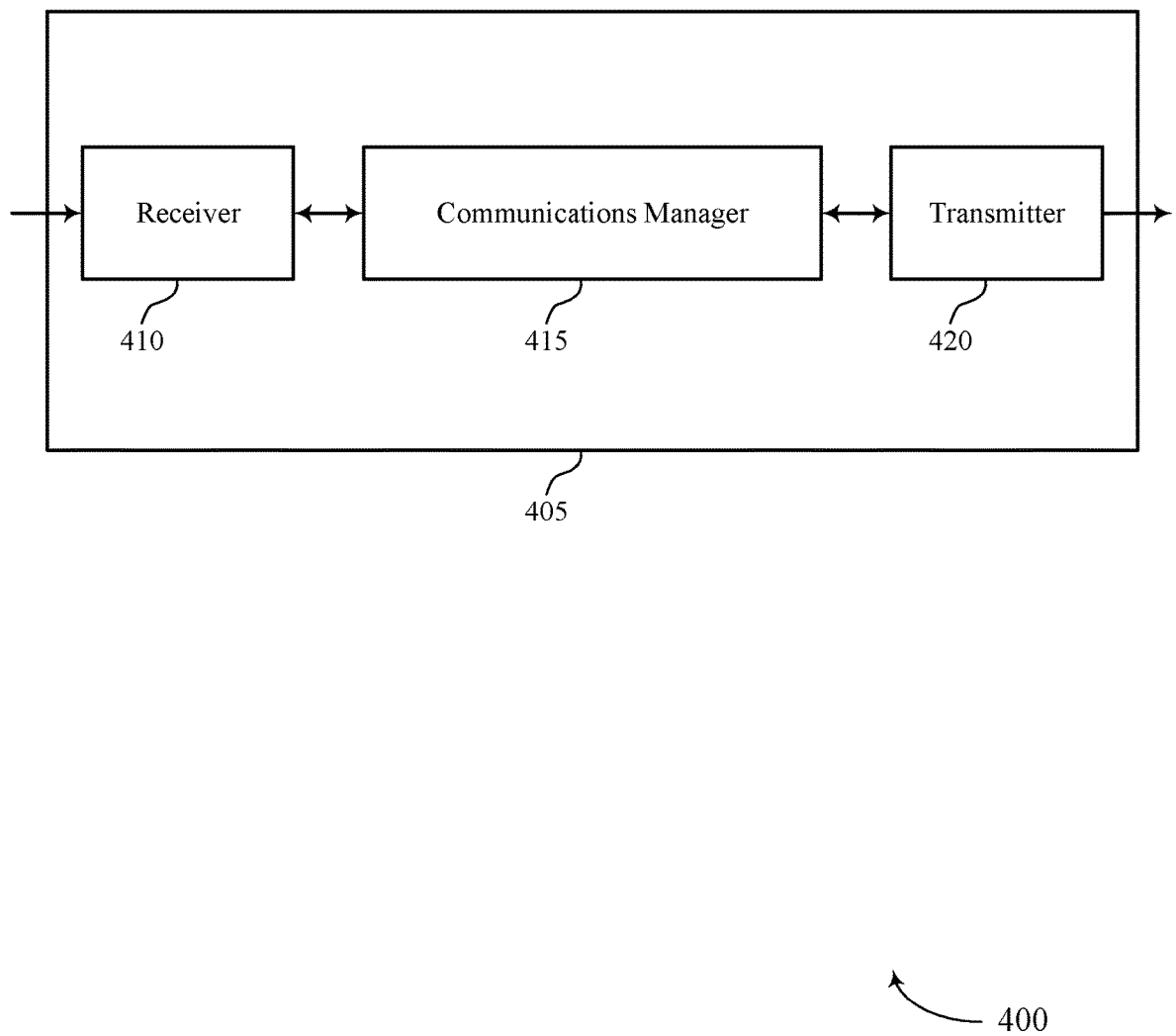
FIGS. 4 and 5 show block diagrams of devices in accordance with aspects of the present disclosure.

FIG. 4 shows a block diagram 400 of a device 405 that supports feedback for sidelink transmissions in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to feedback for sidelink transmission, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may transmit a sidelink data transmission to a second UE via a sidelink channel. In some cases, the communications manager 415 may receive, from the second UE via the sidelink channel, a sidelink channel congestion indicator (e.g., congestion index, sidelink congestion index, etc.). Accordingly, the communications manager 415 may communicate with the second UE via the sidelink channel in accordance with a sidelink operation parameter (e.g., sidelink transmission operation parameter) that is adjusted based on the sidelink channel congestion indicator.

Additionally or alternatively, the communications manager 415 may monitor a sidelink channel for a sidelink data transmission from a second UE. In some cases, the communications manager 415 may transmit, to the second UE via the sidelink channel, a sidelink channel congestion indicator. Accordingly, the communications manager 415 may communicate with the second UE via the sidelink channel in accordance with a sidelink operation parameter that is adjusted based on the sidelink channel congestion indicator. The communications manager 415 may be an example of aspects of the communications manager 710 described herein.

In some examples, the communications manager 415 may be implemented as an integrated circuit or chipset for a mobile device modem, and the receiver 410 and transmitter 420 may be implemented as analog components (e.g., amplifiers, filters, antennas) coupled with the mobile device modem to enable wireless transmission and reception over one or more bands.

The communications manager 415 as described herein may be implemented to realize one or more potential advantages. One implementation may allow the device 405 to indicate and determine a level of congestion in a sidelink communications system via a sidelink channel congestion indicator (e.g., congestion index) to enable an application layer (e.g., base station, scheduler, network, etc.) to adjust one or more sidelink operation parameters to reduce congestion in the sidelink communications system. Accordingly, by enabling the application layer to reduce congestion in the sidelink communications system, the communications manager 415 may increase a reliability that sidelink transmissions are successfully received and decoded by the device 405 or for the device 405 to more reliably transmit a sidelink transmission to a receiver device in the sidelink communications system.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
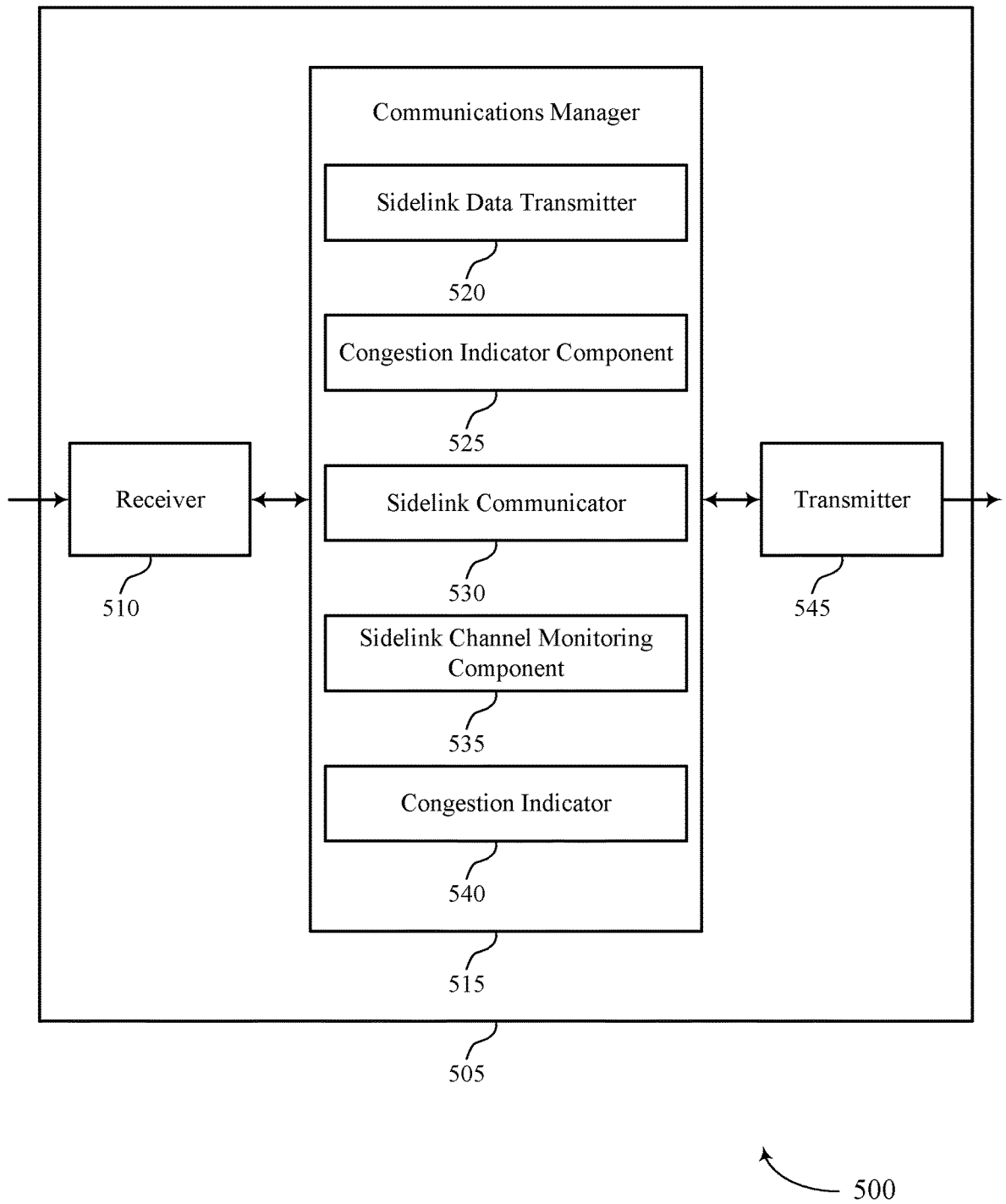

FIG. 5 shows a block diagram 500 of a device 505 that supports feedback for sidelink transmissions in accordance with aspects of the present disclosure. The device 505 may be an example of aspects of a device 405, or a UE 115 as described herein. The device 505 may include a receiver 510, a communications manager 515, and a transmitter 545. The device 505 may also include a processor. Each of these components may be in communication with one another (e.g., via one or more buses).

The receiver 510 may receive information such as packets, user data, or control information associated with various information channels (e.g., control channels, data channels, and information related to feedback for sidelink transmission, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a sidelink data transmitter 520, a congestion indicator component 525, a sidelink communicator 530, a sidelink channel monitoring component 535, and a congestion indicator 540. The communications manager 515 may be an example of aspects of the communications manager 710 described herein.

The sidelink data transmitter 520 may transmit a sidelink data transmission to a second UE via a sidelink channel.

The congestion indicator component 525 may receive, from the second UE via the sidelink channel, a sidelink channel congestion indicator.

The sidelink communicator 530 may communicate with the second UE via the sidelink channel in accordance with a sidelink operation parameter that is adjusted based on the sidelink channel congestion indicator.

The sidelink channel monitoring component 535 may monitor a sidelink channel for a sidelink data transmission from a second UE.

The congestion indicator 540 may transmit, to the second UE via the sidelink channel, a sidelink channel congestion indicator.

Based on techniques for indicating and determining the level of congestion in the sidelink communications system, a processor of a UE 115 (e.g., controlling the receiver 510, the transmitter 545, or the transceiver 720 as described with reference to FIG. 7) may increase reliability of sidelink transmissions being successfully received and decoded at a receiver UE. Additionally, the processor may enable the UE 115 to save power by reducing the number of retransmissions sent as a result of the adjusted sidelink operation parameters. For example, the adjusted sidelink operation parameters may increase the reliability that a first sidelink transmission is successful and no retransmission is needed, thereby reducing power consumption at the UE 115 for having to prepare and transmit a retransmission.

The transmitter 545 may transmit signals generated by other components of the device 505. In some examples, the transmitter 545 may be collocated with a receiver 510 in a transceiver module. For example, the transmitter 545 may be an example of aspects of the transceiver 720 described with reference to FIG. 7. The transmitter 545 may utilize a single antenna or a set of antennas.

Figure 6:
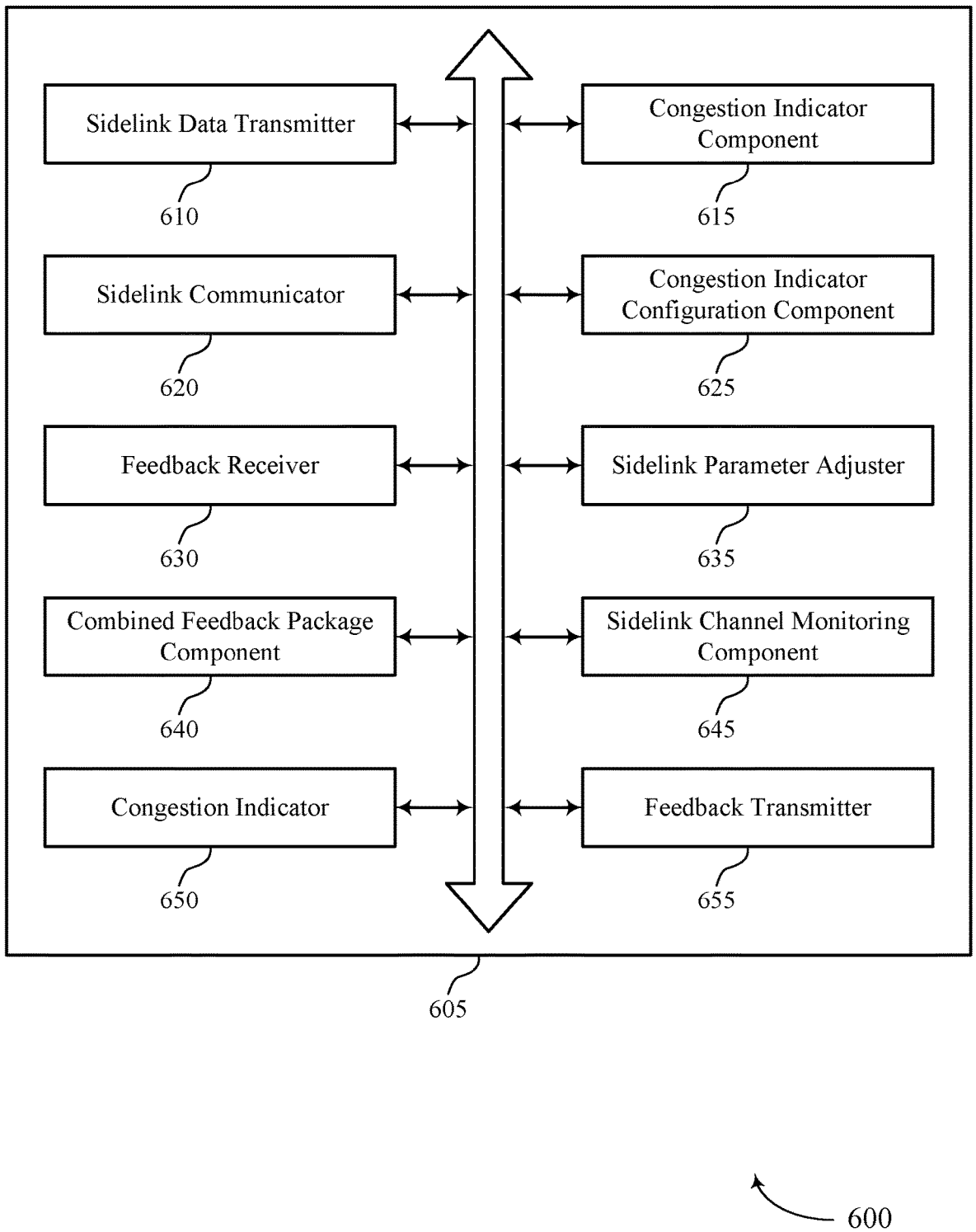
FIG. 6 shows a block diagram of a communications manager in accordance with aspects of the present disclosure.

FIG. 6 shows a block diagram 600 of a communications manager 605 that supports feedback for sidelink transmissions in accordance with aspects of the present disclosure. The communications manager 605 may be an example of aspects of a communications manager 415, a communications manager 515, or a communications manager 710 described herein. The communications manager 605 may include a sidelink data transmitter 610, a congestion indicator component 615, a sidelink communicator 620, a congestion indicator configuration component 625, a feedback receiver 630, a sidelink parameter adjuster 635, a combined feedback package component 640, a sidelink channel monitoring component 645, a congestion indicator 650, and a feedback transmitter 655. Each of these modules may communicate, directly or indirectly, with one another (e.g., via one or more buses).

The sidelink data transmitter 610 may transmit a sidelink data transmission to a second UE via a sidelink channel. In some examples, the sidelink data transmitter 610 may transmit the sidelink data transmission that includes geolocation data for a first UE and one or more packet indexes of one or more packets included within the sidelink data transmission. Additionally, the sidelink data transmitter 610 may transmit the sidelink data transmission as a connectionless sidelink multicast data transmission.

The congestion indicator component 615 may receive, from the second UE via the sidelink channel, a sidelink channel congestion indicator.

The sidelink communicator 620 may communicate with the second UE via the sidelink channel in accordance with a sidelink operation parameter that is adjusted based on the sidelink channel congestion indicator. In some examples, the sidelink communicator 620 may communicate with the second UE via the sidelink channel in accordance with a sidelink operation parameter that is adjusted based on the sidelink channel congestion indicator.

Additionally or alternatively, the sidelink communicator 620 may communicate with the second UE via the sidelink channel in accordance with the sidelink operation parameter that is one or more of a retransmission number parameter, a feedback distance parameter, a distance parameter, a control exclusion distance parameter, an RSRP parameter, a control exclusion RSRP parameter, or any combination thereof. In some examples, the sidelink communicator 620 may retransmit the sidelink data transmission to the second UE via the sidelink channel based on the sidelink operation parameter. Additionally or alternatively, the sidelink communicator 620 may monitor for a retransmission of the sidelink data transmission from the second UE via the sidelink channel based on the sidelink operation parameter.

The sidelink channel monitoring component 645 may monitor a sidelink channel for a sidelink data transmission from a second UE. In some examples, the sidelink channel monitoring component 645 may receive the sidelink data transmission that includes geolocation data for the first UE and one or more packet indexes of one or more packets included within the sidelink data transmission. In some cases, the sidelink data transmission may be a connectionless sidelink multicast data transmission.

The congestion indicator 650 may transmit, to the second UE via the sidelink channel, a sidelink channel congestion indicator.

The congestion indicator configuration component 625 may transmit a congestion indicator configuration to the second UE via the sidelink channel, where the sidelink channel congestion indicator is based on the congestion indicator configuration. In some examples, the congestion indicator configuration component 625 may transmit the congestion indicator configuration to indicate a periodicity at which the second UE is to report the sidelink channel congestion indicator. Additionally or alternatively, the congestion indicator configuration component 625 may transmit the congestion indicator configuration to indicate an event after detection of which the second UE is to report the sidelink channel congestion indicator. In some cases, the congestion indicator configuration may be configured by a network device (e.g., a base station, the network, etc.), preconfigured for the first UE and the second UE (e.g., precoded within the UEs when manufactured), or a combination thereof.

Alternatively, the congestion indicator configuration component 625 may receive a congestion indicator configuration from the second UE via the sidelink channel, where the sidelink channel congestion indicator is transmitted to the second UE based on the congestion indicator configuration. In some examples, the congestion indicator configuration component 625 may receive the congestion indicator configuration that indicates a periodicity at which the first UE is to report the sidelink channel congestion indicator. Additionally or alternatively, the congestion indicator configuration component 625 may receive the congestion indicator configuration that indicates an event after detection of which the first UE is to report the sidelink channel congestion indicator. In some cases, the congestion indicator configuration may be configured by a network device (e.g., a base station, the network, etc.), preconfigured for the first UE and the second UE (e.g., precoded within the UEs when manufactured), or a combination thereof.

The feedback receiver 630 may receive a feedback message for the sidelink data transmission that includes geolocation data for the second UE and an indication of one or more packets received within a time interval, where the communicating with the second UE via the sidelink channel is based on the feedback message. In some examples, the feedback receiver 630 may receive, from the second UE via the sidelink channel, a feedback message including an indication of one or more packets received within a time interval, and may generate a corrected indication of the one or more packets received within the time interval based on processing the feedback message to determine that the second UE did not receive one or more additional packets, where the communicating with the second UE via the sidelink channel is based on the corrected feedback message.

Additionally or alternatively, the feedback receiver 630 may receive, from the second UE via the sidelink channel, a feedback message for the sidelink data transmission that includes one or more of an identifier of the first UE, a PER, a bit rate, a feedback period start, a feedback period end, a packet identifier of a first packet received within a period, a packet identifier of a last packet received within a period, position data for the second UE, orientation data for the second UE, speed data of the second UE, a distance between the first UE and the second UE, or any combination thereof, where the communicating with the second UE via the sidelink channel is based on the feedback message.

In some examples, the feedback receiver 630 may receive a MAC CE that includes a feedback message for the sidelink data transmission, where the communicating with the second UE via the sidelink channel is based on the feedback message. Additionally or alternatively, the feedback receiver 630 may receive, from the second UE, an uplink data transmission that includes a feedback message for the sidelink data transmission, where the communicating with the second UE via the sidelink channel is based on the feedback message. In some examples, the feedback receiver 630 may receive, from the second UE, a feedback message for the sidelink data transmission, the feedback message including the sidelink channel congestion indicator, where the communicating with the second UE via the sidelink channel is based on the feedback message.

The sidelink parameter adjuster 635 may adjust the sidelink operation parameter by adjusting a feedback distance threshold based on the sidelink channel congestion indicator, where the communicating via the sidelink channel is based on a distance between the first UE and the second UE satisfying the adjusted feedback distance threshold. Additionally or alternatively, the sidelink parameter adjuster 635 may adjust the sidelink operation parameter by adjusting one or more of a feedback distance threshold, a control exclusion range threshold, an input data rate, or any combination thereof, based on the sidelink channel congestion indicator, where the communicating with the second UE via the sidelink channel is based on the adjusting.

In some examples, the sidelink parameter adjuster 635 may receive, via the sidelink channel, a first feedback message for the sidelink data transmission from the second UE and at least a second feedback message from at least a third UE, may determine aggregate feedback based on the first feedback message and at least the second feedback message, and may adjust the sidelink operation parameter based on the aggregate feedback, where the communicating with the second UE via the sidelink channel is based on the adjusting.

Additionally or alternatively, the sidelink parameter adjuster 635 may determine an aggregate multicast packet error rate, an aggregate multicast bit rate, or both, at a set of different distances based on the first feedback message and at least the second feedback message and may adjust the sidelink operation parameter based on the aggregate multicast packet error rate, the aggregate multicast bit rate, or both, where the communicating with the second UE via the sidelink channel is based on the adjusting.

In some examples, the sidelink parameter adjuster 635 may adjust the sidelink operation parameter by adjusting a feedback distance threshold based on the sidelink channel congestion indicator, and may transmit a feedback message that negatively acknowledges the sidelink data transmission to trigger retransmission of the sidelink data transmission by the second UE based on a distance between the first UE and the second UE satisfying the adjusted feedback distance threshold.

The combined feedback package component 640 may receive a combined feedback package from the second UE that includes a first feedback message corresponding to the sidelink data transmission and at least a second feedback message for at least one additional wireless device and may parse the first feedback message from the combined feedback package, where the communicating with the second UE via the sidelink channel is based on the first feedback message. Additionally or alternatively, the combined feedback package component 640 may transmit a combined feedback package to the second UE that includes a first feedback message corresponding to the sidelink data transmission and at least the second feedback message for at least one additional wireless device. In some cases, the combined feedback package may include a receiver side congestion index for at least one QoS class.

The feedback transmitter 655 may transmit a feedback message for the sidelink data transmission that includes geolocation data for the first UE and an indication of one or more packets received within a time interval, where the communicating with the second UE via the sidelink channel is based on the feedback message. In some examples, the feedback transmitter 655 may transmit, to the second UE via the sidelink channel, a feedback message for the sidelink data transmission that includes one or more of an identifier of the second UE, a PER, a bit rate, a feedback period start, a feedback period end, a packet identifier of a first packet received within a period, a packet identifier of a last packet received within a period, position data for the first UE, orientation data for the first UE, speed data of the first UE, a distance between the first UE and the second UE, or any combination thereof, where the communicating with the second UE via the sidelink channel is based on the feedback message.

Additionally or alternatively, the feedback transmitter 655 may transmit a MAC CE that includes a feedback message for the sidelink data transmission, where the communicating with the second UE via the sidelink channel is based on the feedback message. In some examples, the feedback transmitter 655 may transmit, to the second UE, an uplink data transmission that includes a feedback message for the sidelink data transmission, where the communicating with the second UE via the sidelink channel is based on the feedback message. Additionally or alternatively, the feedback transmitter 655 may transmit, to the second UE, a feedback message for the sidelink data transmission that includes the sidelink channel congestion indicator, where the communicating with the second UE via the sidelink channel is based on the feedback message.

Figure 7:
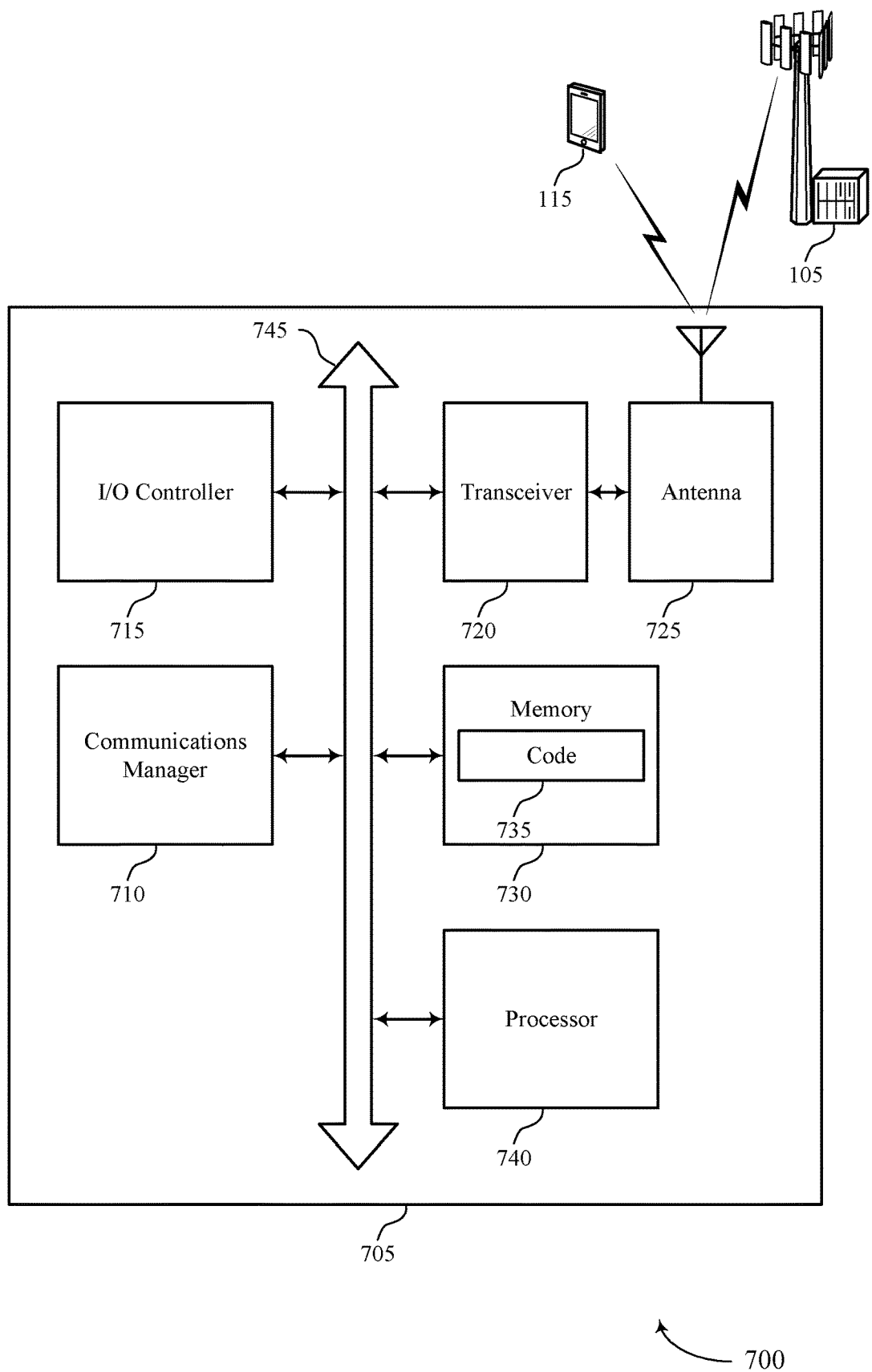
FIG. 7 shows a diagram of a system including a device in accordance with aspects of the present disclosure.

FIG. 7 shows a diagram of a system 700 including a device 705 that supports feedback for sidelink transmissions in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may transmit a sidelink data transmission to a second UE via a sidelink channel. In some cases, the communications manager 710 may receive, from the second UE via the sidelink channel, a sidelink channel congestion indicator. Accordingly, the communications manager 710 may communicate with the second UE via the sidelink channel in accordance with a sidelink operation parameter that is adjusted based on the sidelink channel congestion indicator.

Additionally or alternatively, the communications manager 710 may monitor a sidelink channel for a sidelink data transmission from a second UE. In some cases, the communications manager 710 may transmit, to the second UE via the sidelink channel, a sidelink channel congestion indicator. Accordingly, the communications manager 710 may communicate with the second UE via the sidelink channel in accordance with a sidelink operation parameter that is adjusted based on the sidelink channel congestion indicator.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting feedback for sidelink transmission).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
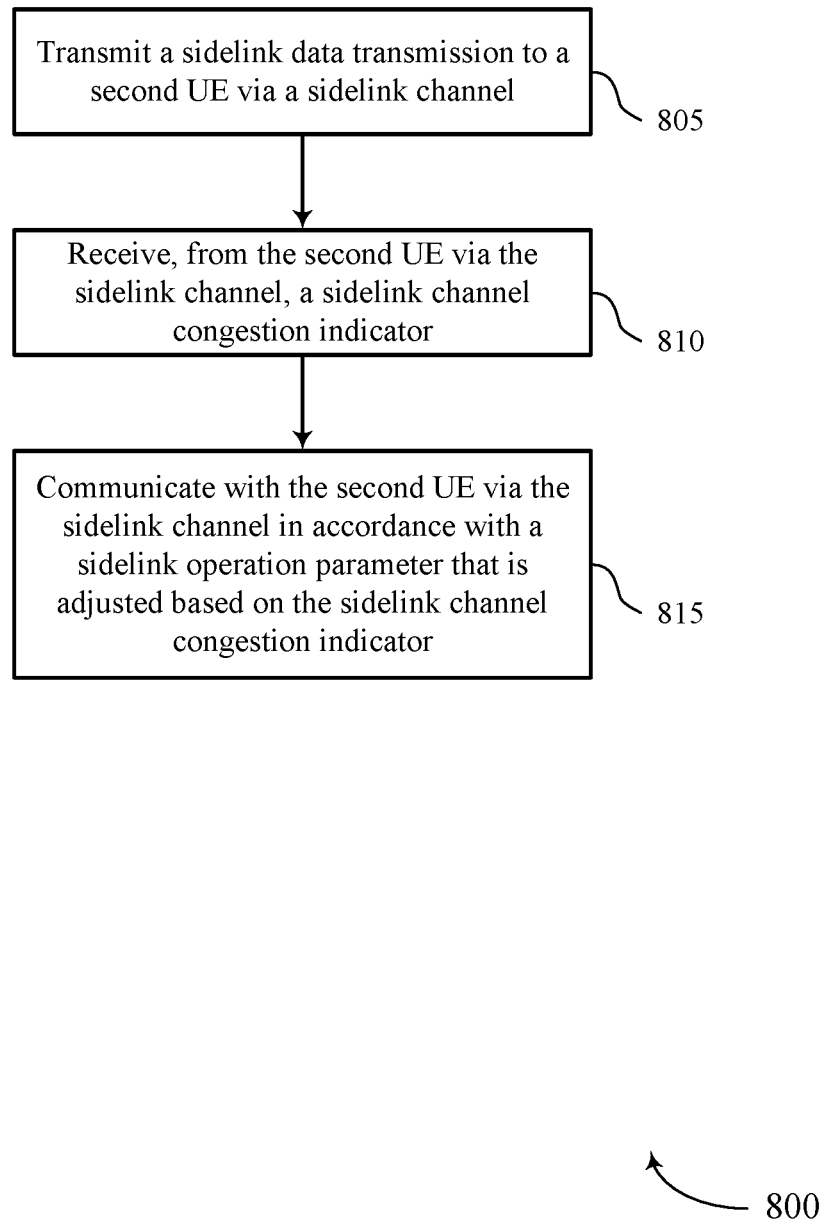
FIGS. 8 through 14 show flowcharts illustrating methods in accordance with aspects of the present disclosure.

FIG. 8 shows a flowchart illustrating a method 800 that supports feedback for sidelink transmissions in accordance with aspects of the present disclosure. The operations of method 800 may be implemented by a UE 115 or its components as described herein. For example, the operations of method 800 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 805, the UE may transmit a sidelink data transmission to a second UE via a sidelink channel. The operations of 805 may be performed according to the methods described herein. In some examples, aspects of the operations of 805 may be performed by a sidelink data transmitter as described with reference to FIGS. 4 through 7.

At 810, the UE may receive, from the second UE via the sidelink channel, a sidelink channel congestion indicator. The operations of 810 may be performed according to the methods described herein. In some examples, aspects of the operations of 810 may be performed by a congestion indicator component as described with reference to FIGS. 4 through 7.

At 815, the UE may communicate with the second UE via the sidelink channel in accordance with a sidelink operation parameter that is adjusted based on the sidelink channel congestion indicator. The operations of 815 may be performed according to the methods described herein. In some examples, aspects of the operations of 815 may be performed by a sidelink communicator as described with reference to FIGS. 4 through 7.

Figure 9:
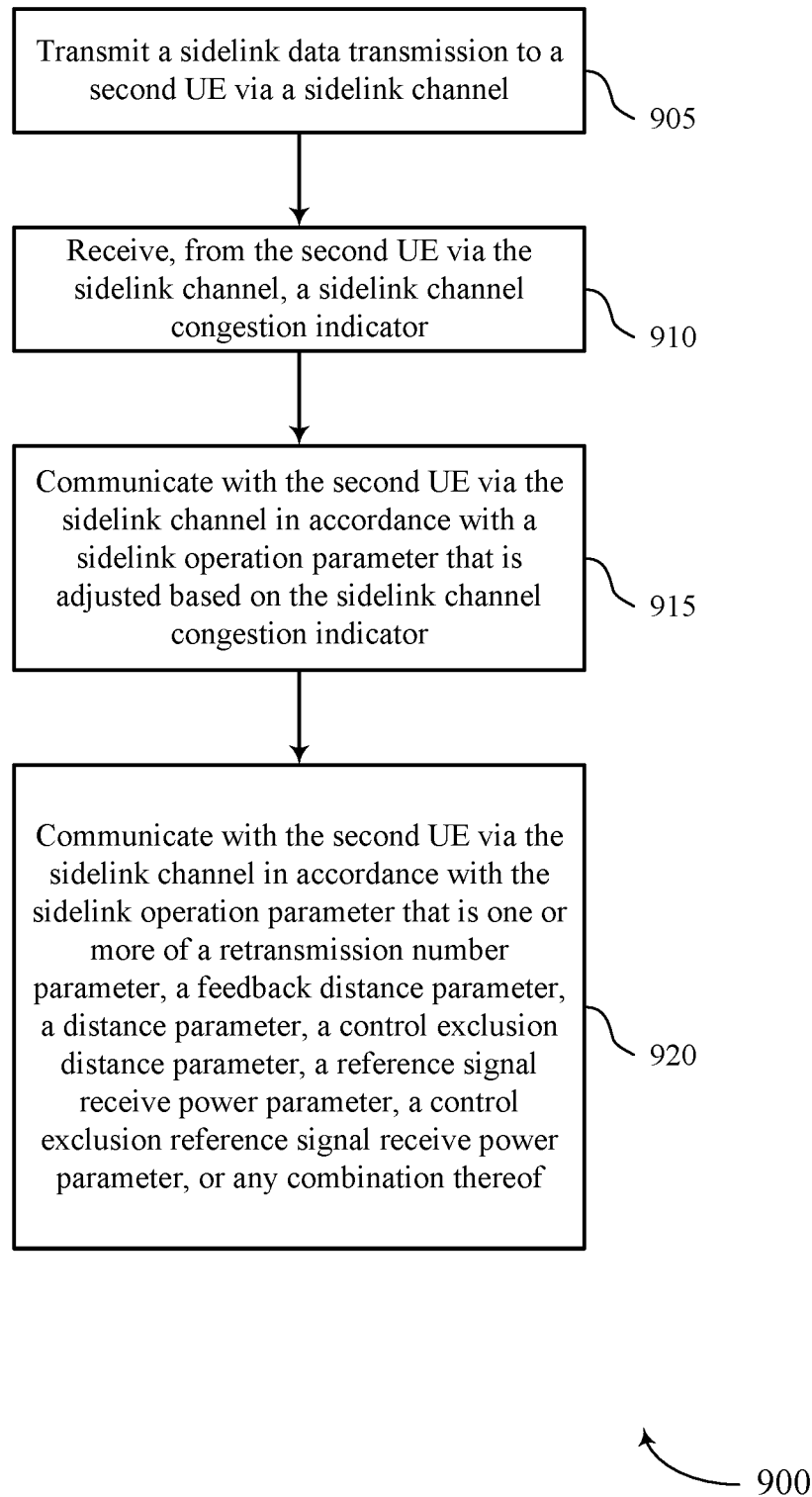

FIG. 9 shows a flowchart illustrating a method 900 that supports feedback for sidelink transmissions in accordance with aspects of the present disclosure. The operations of method 900 may be implemented by a UE 115 or its components as described herein. For example, the operations of method 900 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 905, the UE may transmit a sidelink data transmission to a second UE via a sidelink channel. The operations of 905 may be performed according to the methods described herein. In some examples, aspects of the operations of 905 may be performed by a sidelink data transmitter as described with reference to FIGS. 4 through 7.

At 910, the UE may receive, from the second UE via the sidelink channel, a sidelink channel congestion indicator. The operations of 910 may be performed according to the methods described herein. In some examples, aspects of the operations of 910 may be performed by a congestion indicator component as described with reference to FIGS. 4 through 7.

At 915, the UE may communicate with the second UE via the sidelink channel in accordance with a sidelink operation parameter that is adjusted based on the sidelink channel congestion indicator. The operations of 915 may be performed according to the methods described herein. In some examples, aspects of the operations of 915 may be performed by a sidelink communicator as described with reference to FIGS. 4 through 7.

At 920, the UE may communicate with the second UE via the sidelink channel in accordance with the sidelink operation parameter that is one or more of a retransmission number parameter, a feedback distance parameter, a distance parameter, a control exclusion distance parameter, a reference signal receive power parameter, a control exclusion reference signal receive power parameter, or any combination thereof. The operations of 920 may be performed according to the methods described herein. In some examples, aspects of the operations of 920 may be performed by a sidelink communicator as described with reference to FIGS. 4 through 7.

Figure 10:
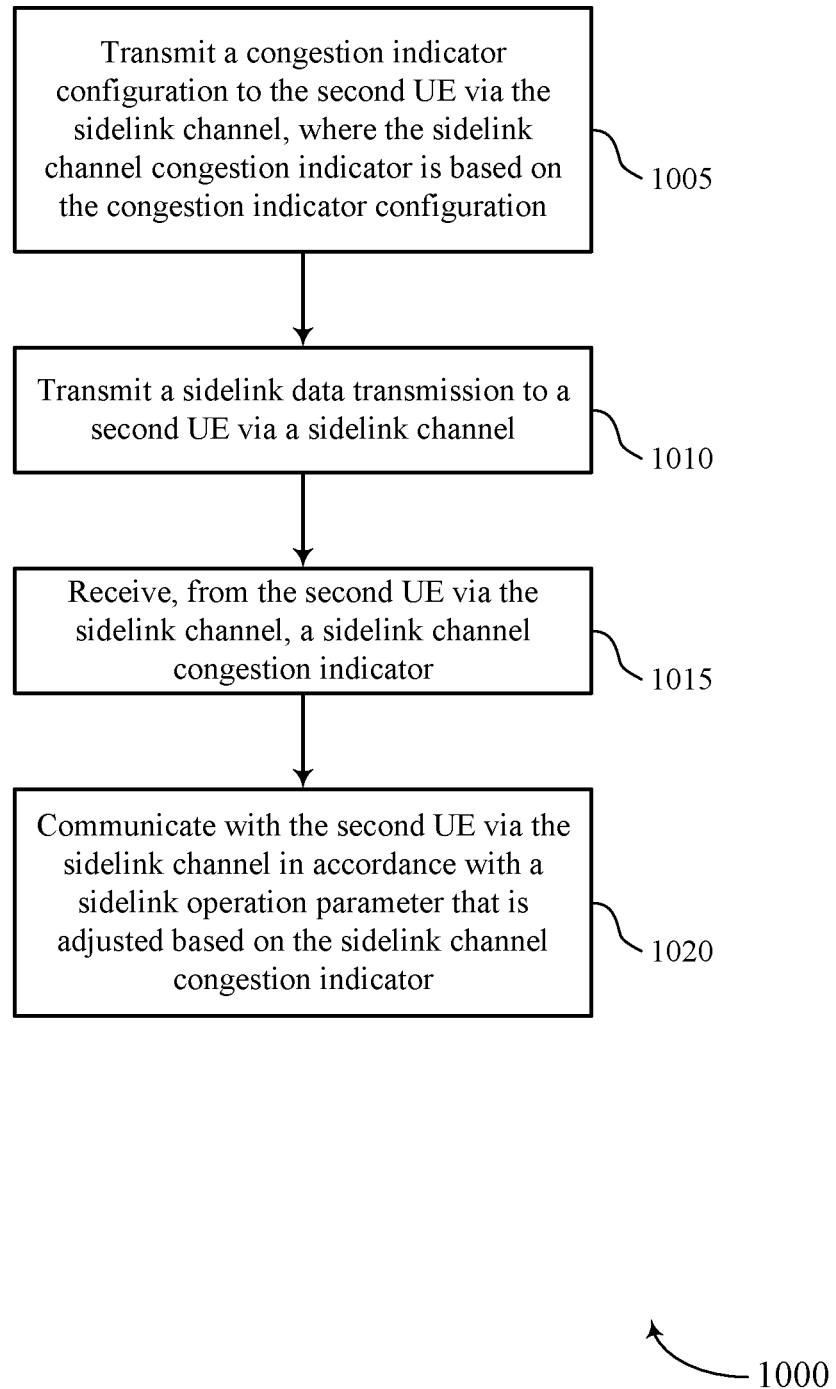

FIG. 10 shows a flowchart illustrating a method 1000 that supports feedback for sidelink transmissions in accordance with aspects of the present disclosure. The operations of method 1000 may be implemented by a UE 115 or its components as described herein. For example, the operations of method 1000 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1005, the UE may transmit a congestion indicator configuration to the second UE via the sidelink channel, where the sidelink channel congestion indicator is based on the congestion indicator configuration. The operations of 1005 may be performed according to the methods described herein. In some examples, aspects of the operations of 1005 may be performed by a congestion indicator configuration component as described with reference to FIGS. 4 through 7.

At 1010, the UE may transmit a sidelink data transmission to a second UE via a sidelink channel. The operations of 1010 may be performed according to the methods described herein. In some examples, aspects of the operations of 1010 may be performed by a sidelink data transmitter as described with reference to FIGS. 4 through 7.

At 1015, the UE may receive, from the second UE via the sidelink channel, a sidelink channel congestion indicator. The operations of 1015 may be performed according to the methods described herein. In some examples, aspects of the operations of 1015 may be performed by a congestion indicator component as described with reference to FIGS. 4 through 7.

At 1020, the UE may communicate with the second UE via the sidelink channel in accordance with a sidelink operation parameter that is adjusted based on the sidelink channel congestion indicator. The operations of 1020 may be performed according to the methods described herein. In some examples, aspects of the operations of 1020 may be performed by a sidelink communicator as described with reference to FIGS. 4 through 7.

Figure 11:
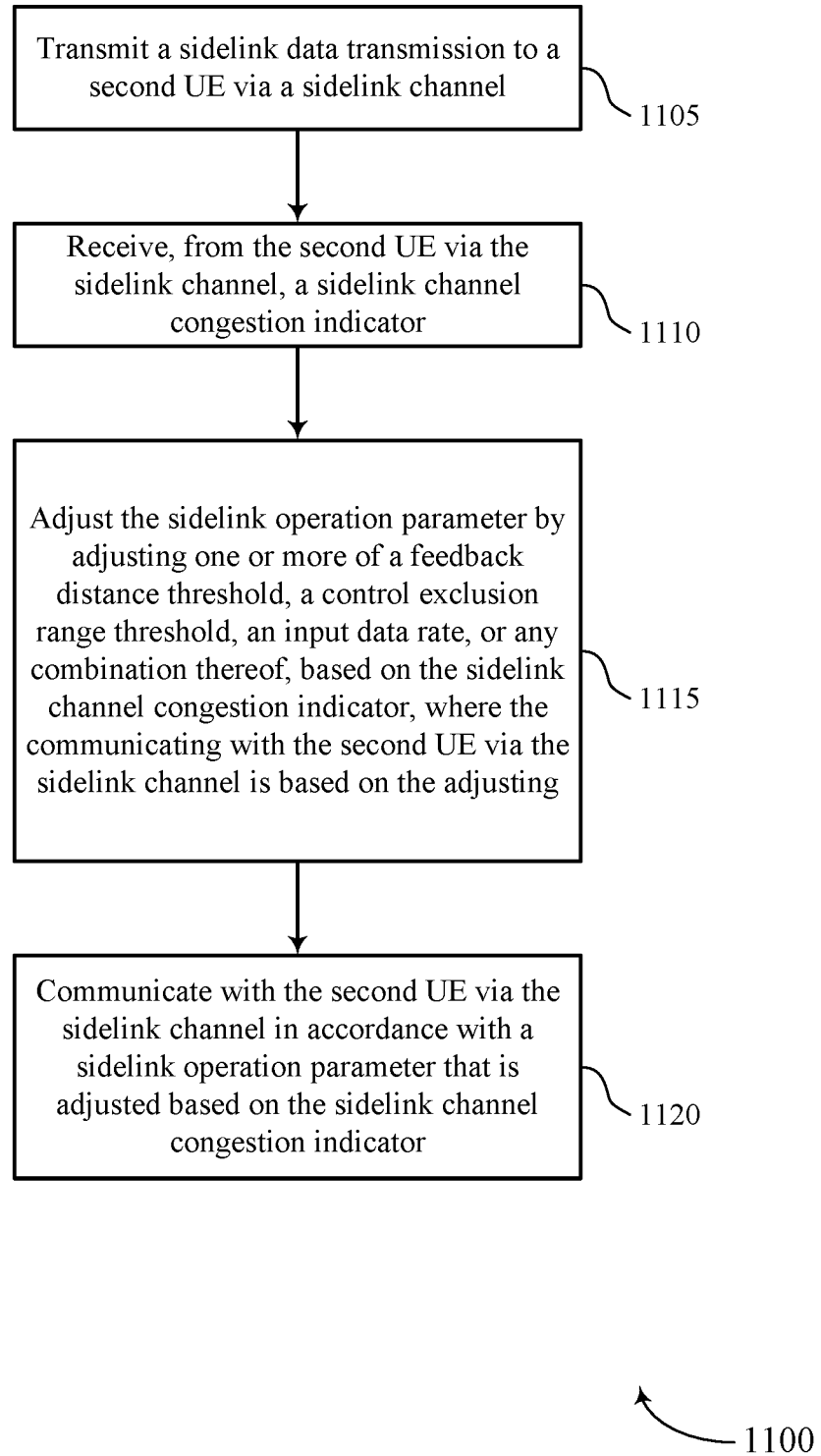

FIG. 11 shows a flowchart illustrating a method 1100 that supports feedback for sidelink transmissions in accordance with aspects of the present disclosure. The operations of method 1100 may be implemented by a UE 115 or its components as described herein. For example, the operations of method 1100 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1105, the UE may transmit a sidelink data transmission to a second UE via a sidelink channel. The operations of 1105 may be performed according to the methods described herein. In some examples, aspects of the operations of 1105 may be performed by a sidelink data transmitter as described with reference to FIGS. 4 through 7.

At 1110, the UE may receive, from the second UE via the sidelink channel, a sidelink channel congestion indicator. The operations of 1110 may be performed according to the methods described herein. In some examples, aspects of the operations of 1110 may be performed by a congestion indicator component as described with reference to FIGS. 4 through 7.

At 1115, the UE may adjust the sidelink operation parameter by adjusting one or more of a feedback distance threshold, a control exclusion range threshold, an input data rate, or any combination thereof, based on the sidelink channel congestion indicator, where the communicating with the second UE via the sidelink channel is based on the adjusting. The operations of 1115 may be performed according to the methods described herein. In some examples, aspects of the operations of 1115 may be performed by a sidelink parameter adjuster as described with reference to FIGS. 4 through 7.

At 1120, the UE may communicate with the second UE via the sidelink channel in accordance with a sidelink operation parameter that is adjusted based on the sidelink channel congestion indicator. The operations of 1120 may be performed according to the methods described herein. In some examples, aspects of the operations of 1120 may be performed by a sidelink communicator as described with reference to FIGS. 4 through 7.

Figure 12:
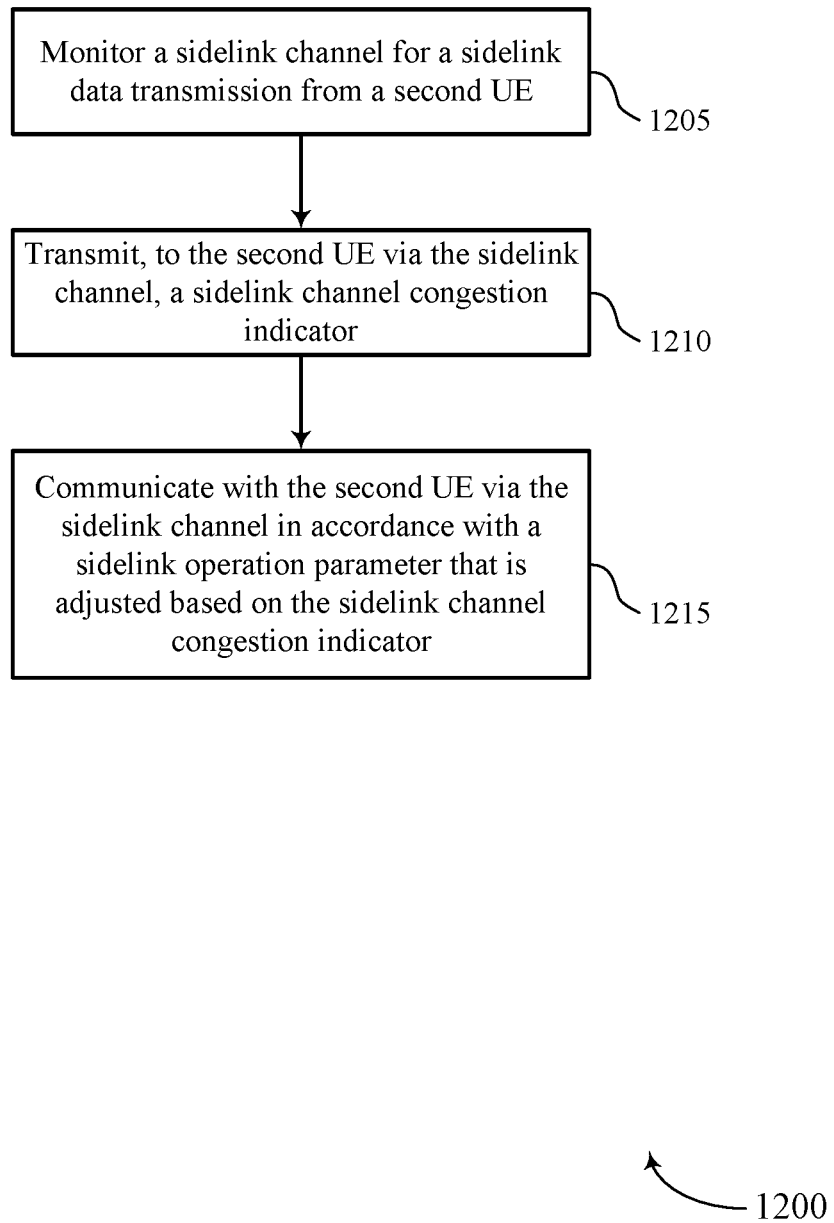

FIG. 12 shows a flowchart illustrating a method 1200 that supports feedback for sidelink transmissions in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may monitor a sidelink channel for a sidelink data transmission from a second UE. The operations of 1205 may be performed according to the methods described herein. In some examples, aspects of the operations of 1205 may be performed by a sidelink channel monitoring component as described with reference to FIGS. 4 through 7.

At 1210, the UE may transmit, to the second UE via the sidelink channel, a sidelink channel congestion indicator. The operations of 1210 may be performed according to the methods described herein. In some examples, aspects of the operations of 1210 may be performed by a congestion indicator as described with reference to FIGS. 4 through 7.

At 1215, the UE may communicate with the second UE via the sidelink channel in accordance with a sidelink operation parameter that is adjusted based on the sidelink channel congestion indicator. The operations of 1215 may be performed according to the methods described herein. In some examples, aspects of the operations of 1215 may be performed by a sidelink communicator as described with reference to FIGS. 4 through 7.

Figure 13:
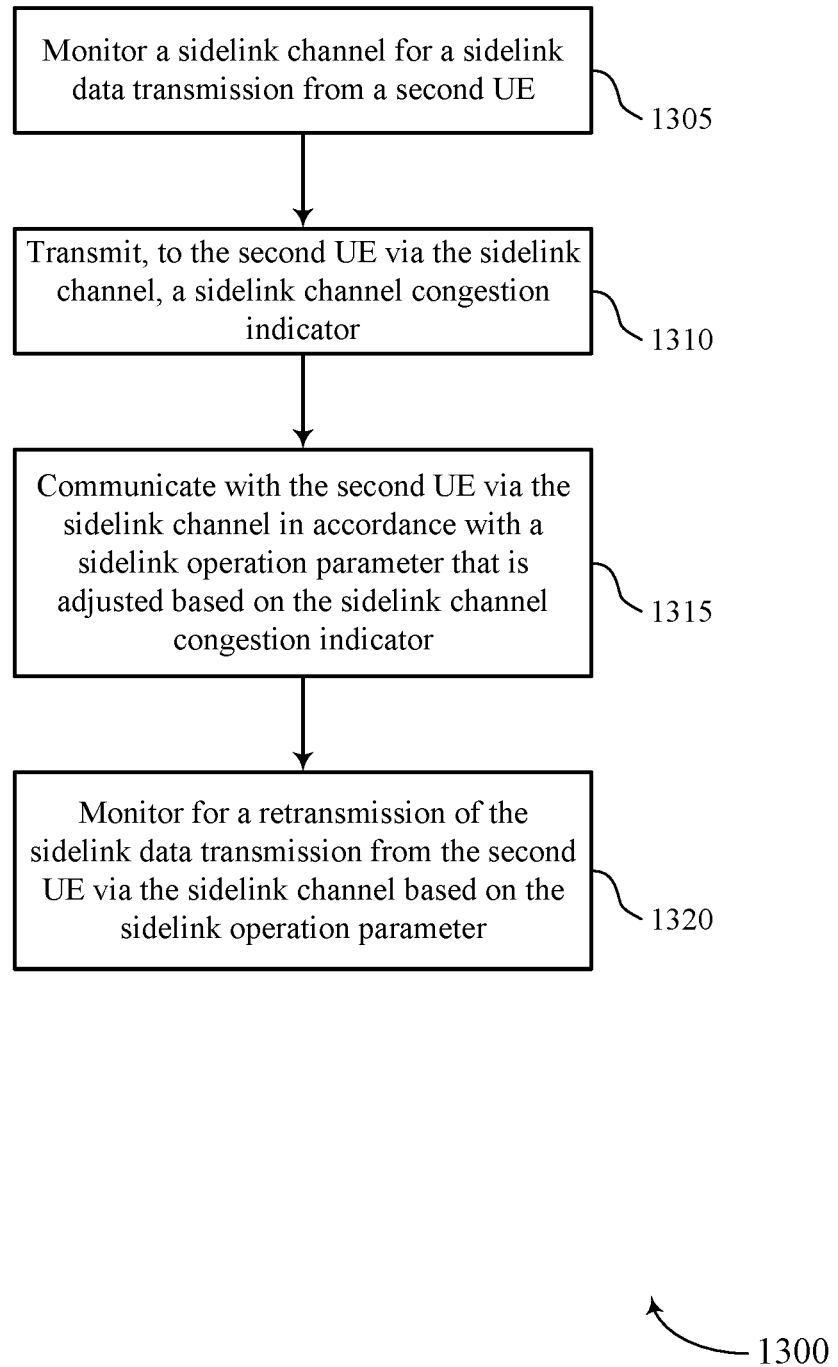

FIG. 13 shows a flowchart illustrating a method 1300 that supports feedback for sidelink transmissions in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE may monitor a sidelink channel for a sidelink data transmission from a second UE. The operations of 1305 may be performed according to the methods described herein. In some examples, aspects of the operations of 1305 may be performed by a sidelink channel monitoring component as described with reference to FIGS. 4 through 7.

At 1310, the UE may transmit, to the second UE via the sidelink channel, a sidelink channel congestion indicator. The operations of 1310 may be performed according to the methods described herein. In some examples, aspects of the operations of 1310 may be performed by a congestion indicator as described with reference to FIGS. 4 through 7.

At 1315, the UE may communicate with the second UE via the sidelink channel in accordance with a sidelink operation parameter that is adjusted based on the sidelink channel congestion indicator. The operations of 1315 may be performed according to the methods described herein. In some examples, aspects of the operations of 1315 may be performed by a sidelink communicator as described with reference to FIGS. 4 through 7.

At 1320, the UE may monitor for a retransmission of the sidelink data transmission from the second UE via the sidelink channel based on the sidelink operation parameter. The operations of 1320 may be performed according to the methods described herein. In some examples, aspects of the operations of 1320 may be performed by a sidelink communicator as described with reference to FIGS. 4 through 7.

Figure 14:
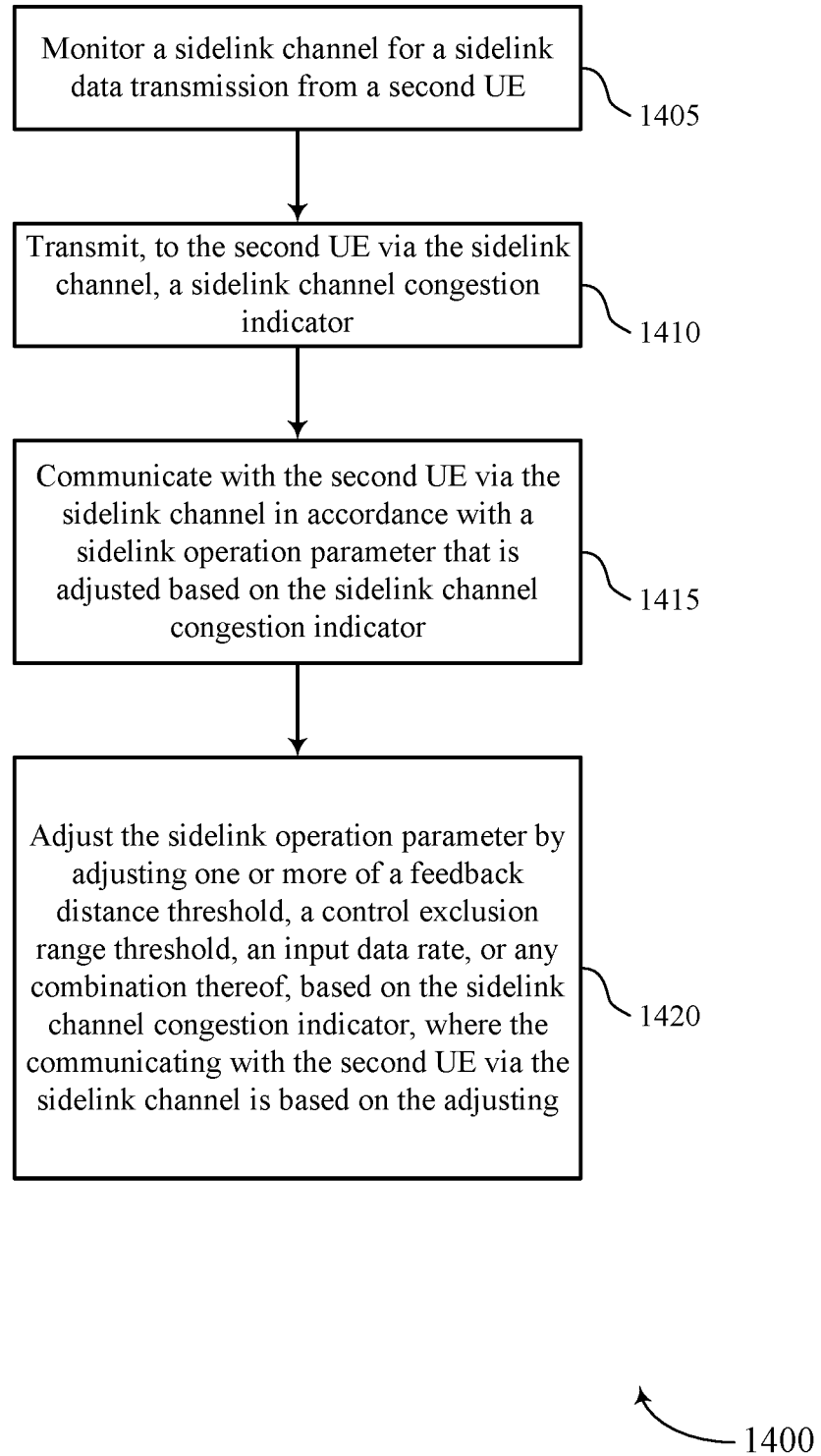

FIG. 14 shows a flowchart illustrating a method 1400 that supports feedback for sidelink transmissions in accordance with aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1405, the UE may monitor a sidelink channel for a sidelink data transmission from a second UE. The operations of 1405 may be performed according to the methods described herein. In some examples, aspects of the operations of 1405 may be performed by a sidelink channel monitoring component as described with reference to FIGS. 4 through 7.

At 1410, the UE may transmit, to the second UE via the sidelink channel, a sidelink channel congestion indicator. The operations of 1410 may be performed according to the methods described herein. In some examples, aspects of the operations of 1410 may be performed by a congestion indicator as described with reference to FIGS. 4 through 7.

At 1415, the UE may communicate with the second UE via the sidelink channel in accordance with a sidelink operation parameter that is adjusted based on the sidelink channel congestion indicator. The operations of 1415 may be performed according to the methods described herein. In some examples, aspects of the operations of 1415 may be performed by a sidelink communicator as described with reference to FIGS. 4 through 7.

At 1420, the UE may adjust the sidelink operation parameter by adjusting one or more of a feedback distance threshold, a control exclusion range threshold, an input data rate, or any combination thereof, based on the sidelink channel congestion indicator, where the communicating with the second UE via the sidelink channel is based on the adjusting. The operations of 1420 may be performed according to the methods described herein. In some examples, aspects of the operations of 1420 may be performed by a sidelink parameter adjuster as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a first user equipment (UE), comprising:

transmitting at least one sidelink data transmission to a plurality of UEs via a sidelink channel;

receiving, from a second UE of the plurality of UEs via the sidelink channel in response to the at least one sidelink data transmission, a combined feedback package, the combined feedback package comprising a plurality of sidelink channel congestion indicators associated with the at least one sidelink data transmission, a first feedback message corresponding to the at least one sidelink data transmission, a second feedback message for at least a third UE of the plurality of UEs, and a receiver side congestion index for at least one quality of service class; and communicating, based at least in part on the first feedback message parsed from the combined feedback package, with the second UE of the plurality of UEs via the sidelink channel in accordance with a sidelink operation parameter that is adjusted based at least in part on an aggregate sidelink channel congestion corresponding to the plurality of sidelink channel congestion indicators.

2. The method of claim 1, wherein communicating with the second UE via the sidelink channel comprises:

communicating with the second UE via the sidelink channel in accordance with the sidelink operation parameter that is one or more of a retransmission number parameter, a feedback distance parameter, a distance parameter, a control exclusion distance parameter, a reference signal receive power parameter, a control exclusion reference signal receive power parameter, or any combination thereof.

3. The method of claim 1, wherein communicating with the second UE via the sidelink channel comprises:

retransmitting the at least one sidelink data transmission to the second UE via the sidelink channel based at least in part on the sidelink operation parameter.

4. The method of claim 1, further comprising:

transmitting a congestion indicator configuration to the second UE via the sidelink channel, wherein at least one sidelink channel congestion indicator of the plurality of sidelink channel congestion indicators is based at least in part on the congestion indicator configuration.

5. The method of claim 4, wherein transmitting the congestion indicator configuration comprises:

transmitting the congestion indicator configuration to indicate a periodicity at which the second UE is to report the at least one sidelink channel congestion indicator.

6. The method of claim 4, wherein transmitting the congestion indicator configuration comprises:

transmitting the congestion indicator configuration to indicate an event after detection of which the second UE is to report the at least one sidelink channel congestion indicator.

7. The method of claim 1, wherein at least one sidelink channel congestion indicator of the plurality of sidelink channel congestion indicators is received from the second UE in accordance with a congestion indicator configuration, and wherein the first UE is configured by a network device with the congestion indicator configuration or the first UE is preconfigured with the congestion indicator configuration.

8. The method of claim 1, wherein transmitting the at least one sidelink data transmission comprises:

transmitting the at least one sidelink data transmission that comprises geolocation data for the first UE and one or more packet indexes of one or more packets included within the at least one sidelink data transmission.

9. The method of claim 1, further comprising:
receiving a feedback message for the at least one sidelink data transmission that comprises geolocation data for the second UE and an indication of one or more packets received within a time interval, wherein the communicating with the second UE via the sidelink channel is based at least in part on the feedback message.

10. The method of claim 1, further comprising:
adjusting the sidelink operation parameter by adjusting a feedback distance threshold based at least in part on the aggregate sidelink channel congestion, wherein the communicating via the sidelink channel is based at least in part on a distance between the first UE and the second UE satisfying the adjusted feedback distance threshold.

11. The method of claim 1, further comprising:
adjusting the sidelink operation parameter by adjusting one or more of a feedback distance threshold, a control exclusion range threshold, an input data rate, or any combination thereof, based at least in part on the plurality of sidelink channel congestion indicators, wherein the communicating with the second UE via the sidelink channel is based at least in part on the adjusting.

12. The method of claim 1, further comprising:
receiving, from the second UE via the sidelink channel, a feedback message providing an indication of one or more packets received within a time interval; and
generating a corrected indication of the one or more packets received within the time interval based at least in part on processing the feedback message to determine that the second UE did not receive one or more additional packets, wherein the communicating with the second UE via the sidelink channel is based at least in part on the corrected indication.

13. The method of claim 1, further comprising:
determining aggregate feedback based at least in part on the first feedback message and at least the second feedback message; and
adjusting the sidelink operation parameter based at least in part on the aggregate feedback, wherein the communicating with the second UE via the sidelink channel is based at least in part on the adjusting.

14. The method of claim 1, further comprising:
determining an aggregate multicast packet error rate, an aggregate multicast bit rate, or both, at a plurality of different distances based at least in part on the first feedback message and at least the second feedback message; and
adjusting the sidelink operation parameter based at least in part on the aggregate multicast packet error rate, the aggregate multicast bit rate, or both, wherein the communicating with the second UE via the sidelink channel is based at least in part on the adjusting.

15. The method of claim 1, further comprising:
receiving, from the second UE via the sidelink channel, a feedback message for the at least one sidelink data transmission that comprises one or more of an identifier of the first UE, a packet error rate, a bit rate, a feedback period start, a feedback period end, a packet identifier of a first packet received within a period, a packet identifier of a last packet received within a period, position data for the second UE, orientation data for the second UE, speed data of the second UE, a distance between the first UE and the second UE, or any combination thereof, wherein the communicating with the second UE via the sidelink channel is based at least in part on the feedback message.

16. The method of claim 1, further comprising:
receiving a medium access control (MAC) control element (CE) that comprises a feedback message for the at least one sidelink data transmission, wherein the communicating with the second UE via the sidelink channel is based at least in part on the feedback message.

17. The method of claim 1, further comprising:
receiving, from the second UE, an uplink data transmission that comprises a feedback message for the at least one sidelink data transmission, wherein the communicating with the second UE via the sidelink channel is based at least in part on the feedback message.

18. The method of claim 1, further comprising:
receiving, from the second UE, a feedback message for the at least one sidelink data transmission, the feedback message comprising at least one sidelink channel congestion indicator of the plurality of sidelink channel congestion indicators, wherein the communicating with the second UE via the sidelink channel is based at least in part on the feedback message.

19. The method of claim 1, wherein transmitting the at least one sidelink data transmission comprises:
transmitting the at least one sidelink data transmission as a connectionless sidelink multicast data transmission.

20. A method for wireless communications by a first user equipment (UE), comprising:
monitoring a sidelink channel for a first sidelink data transmission from a second UE and a second sidelink data transmission from a third UE;
transmitting, to the second UE via the sidelink channel in response to the monitoring, a combined feedback package comprising a first sidelink channel congestion indicator associated with the first sidelink data transmission and a second sidelink channel congestion indicator associated with the second sidelink data transmission; and
communicating with the second UE via the sidelink channel in accordance with a sidelink operation parameter that is adjusted based at least in part on the first sidelink channel congestion indicator transmitted to the second UE.

21. The method of claim 20, wherein communicating with the second UE via the sidelink channel comprises:
communicating with the second UE via the sidelink channel in accordance with the sidelink operation parameter that is one or more of a retransmission number parameter, a feedback distance parameter, a distance parameter, a control exclusion distance parameter, a reference signal receive power parameter, a control exclusion reference signal receive power parameter, or any combination thereof.

22. The method of claim 20, wherein communicating with the second UE via the sidelink channel comprises:
monitoring for a retransmission of the first sidelink data transmission from the second UE via the sidelink channel based at least in part on the sidelink operation parameter.

23. The method of claim 20, further comprising:
receiving a congestion indicator configuration from the second UE via the sidelink channel, wherein the first sidelink channel congestion indicator is transmitted to the second UE based at least in part on the congestion indicator configuration.

24. The method of claim 23, wherein receiving the congestion indicator configuration comprises:
receiving the congestion indicator configuration that indicates a periodicity at which the first UE is to report the first sidelink channel congestion indicator.

25. The method of claim 23, wherein receiving the congestion indicator configuration comprises:
receiving the congestion indicator configuration that indicates an event after detection of which the first UE is to report the first sidelink channel congestion indicator.

26. The method of claim 20, wherein the first sidelink channel congestion indicator is transmitted to the second UE in accordance with a congestion indicator configuration, and wherein the first UE is configured by a network device with the congestion indicator configuration or the first UE is preconfigured with the congestion indicator configuration.

27. An apparatus for wireless communications by a first user equipment (UE), comprising:
one or more processors,
one or more memories coupled with the one or more processors; and
instructions stored in the one or more memories and executable by the one or more processors to cause the apparatus to:
transmit at least one sidelink data transmission to a plurality of UEs via a sidelink channel;
receive, from a second UE of the plurality of UEs via the sidelink channel in response to the at least one sidelink data transmission, a combined feedback package, the combined feedback package comprising a plurality of sidelink channel congestion indicators associated with the at least one sidelink data transmission, a first feedback message corresponding to the at least one sidelink data transmission, a second feedback message for at least a third UE of the plurality of UEs, and a receiver side congestion index for at least one quality of service class; and
communicate, based at least in part on the first feedback message parsed from the combined feedback package, with the second UE of the plurality of UEs via the sidelink channel in accordance with a sidelink operation parameter that is adjusted based at least in part on an aggregate sidelink channel congestion corresponding to the plurality of sidelink channel congestion indicators.

28. An apparatus for wireless communications by a first user equipment (UE), comprising:
one or more processors,
one or more memories coupled with the one or more processors; and
instructions stored in the one or more memories and executable by the one or more processors to cause the apparatus to:
monitor a sidelink channel for a first sidelink data transmission from a second UE and a second sidelink data transmission from a third UE;
transmit, to the second UE via the sidelink channel in response to the sidelink channel being monitored, a combined feedback package comprising a first sidelink channel congestion indicator associated with the first sidelink data transmission and a second sidelink channel congestion indicator associated with the second sidelink data transmission; and
communicate with the second UE via the sidelink channel in accordance with a sidelink operation parameter that is adjusted based at least in part on the first sidelink channel congestion indicator transmitted to the second UE.

29. The apparatus of claim 27, wherein to communicate with the second UE via the sidelink channel, the one or more processors are operable to execute the instructions to cause the apparatus to:
communicate with the second UE via the sidelink channel in accordance with the sidelink operation parameter that is one or more of a retransmission number parameter, a feedback distance parameter, a distance parameter, a control exclusion distance parameter, a reference signal receive power parameter, a control exclusion reference signal receive power parameter, or any combination thereof.

30. The apparatus of claim 28, wherein to communicate with the second UE via the sidelink channel, the one or more processors are operable to execute the instructions to cause the apparatus to:
communicate with the second UE via the sidelink channel in accordance with the sidelink operation parameter that is one or more of a retransmission number parameter, a feedback distance parameter, a distance parameter, a control exclusion distance parameter, a reference signal receive power parameter, a control exclusion reference signal receive power parameter, or any combination thereof.

* * * * *